US010764921B2

(12) United States Patent
Park et al.

(10) Patent No.: US 10,764,921 B2
(45) Date of Patent: Sep. 1, 2020

(54) METHOD FOR FRAME TRANSMITTED ON BASIS OF RANDOM ACCESS IN WIRELESS LAN SYSTEM AND WIRELESS TERMINAL USING SAME

(71) Applicant: LG ELECTRONICS INC., Seoul (KR)

(72) Inventors: Hyunhee Park, Seoul (KR); Kiseon Ryu, Seoul (KR); Suhwook Kim, Seoul (KR); Jeongki Kim, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/094,192

(22) PCT Filed: Apr. 17, 2017

(86) PCT No.: PCT/KR2017/004104

§ 371 (c)(1),
(2) Date: Oct. 16, 2018

(87) PCT Pub. No.: WO2017/183870

PCT Pub. Date: Oct. 26, 2017

(65) Prior Publication Data

US 2019/0159245 A1 May 23, 2019

Related U.S. Application Data

(60) Provisional application No. 62/323,818, filed on Apr. 18, 2016, provisional application No. 62/349,136,
(Continued)

(51) Int. Cl.
*H04W 74/00* (2009.01)
*H04W 84/12* (2009.01)
*H04W 74/08* (2009.01)

(52) U.S. Cl.
CPC ..... *H04W 74/008* (2013.01); *H04W 74/0833* (2013.01); *H04W 84/12* (2013.01); *H04W 74/006* (2013.01)

(58) Field of Classification Search
CPC ........... H04W 74/008; H04W 74/0833; H04W 84/12; H04W 74/006
See application file for complete search history.

(56) References Cited

U.S. PATENT DOCUMENTS 7,027,462 B2 4/2006 Benveniste
10,285,200 B2 * 5/2019 Li ........................ H04W 74/02
(Continued)

FOREIGN PATENT DOCUMENTS

WO 2013077690 5/2013
WO 2015186887 12/2015
WO 2016039931 3/2016

OTHER PUBLICATIONS

PCT International Application No. PCT/KR2017/004104, International Search Report dated Jul. 21, 2017, 7 pages.
(Continued)

*Primary Examiner* — Duc C Ho
(74) *Attorney, Agent, or Firm* — Lee, Hong, Degerman, Kang & Waimey

(57) ABSTRACT

A method for a frame transmitted on the basis of random access in a wireless LAN system according to the present embodiment comprises the steps of: receiving, by a user STA, a trigger frame from an AP, the trigger frame including identification information for random access and resource information indicating a random access resource unit corresponding to the identification information; performing a countdown operation for the random access resource unit by the user STA; and transmitting, by the user STA, a first uplink frame to the AP on the basis of the random access resource unit obtained through the countdown operation, the
(Continued)

first uplink frame including buffer status information associated with traffic buffered in the user STA, wherein the first uplink frame is a frame requesting the AP for transmission of a response.

10 Claims, 26 Drawing Sheets

Related U.S. Application Data filed on Jun. 13, 2016, provisional application No. 62/349,659, filed on Jun. 14, 2016, provisional application No. 62/441,451, filed on Jan. 2, 2017.

(56) References Cited

U.S. PATENT DOCUMENTS

2015/0264090 A1 9/2015 Kim et al.
2016/0262185 A1* 9/2016 Ghosh ................... H04W 72/04
2016/0316472 A1* 10/2016 Kwon ................... H04L 5/0055
2016/0359653 A1* 12/2016 Lee ..................... H04L 27/2613
2019/0007977 A1* 1/2019 Asterjadhi ........ H04W 74/0833

OTHER PUBLICATIONS

LAN/MAN Standards Committee of the IEEE Computer Society, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN", doc.: IEEE P802.11ax/D1.0, Nov. 2016, 453 pages.

* cited by examiner (A)

(B)

METHOD FOR FRAME TRANSMITTED ON BASIS OF RANDOM ACCESS IN WIRELESS LAN SYSTEM AND WIRELESS TERMINAL USING SAME

CROSS-REFERENCE TO RELATED APPLICATIONS

This application is the National Stage filing under 35 U.S.C. 371 of International Application No. PCT/KR2017/004104, filed on Apr. 17, 2017, which claims the benefit of U.S. Provisional Application No. 62/323,818, filed on Apr. 18, 2016, 62/349,136, filed on Jun. 13, 2016, 62/349,659, filed on Jun. 14, 2016, and 62/441,451, filed on Jan. 2, 2017, the contents of which are all hereby incorporated by reference herein in their entireties.

BACKGROUND OF THE INVENTION

Field of the Invention

The present specification relates to wireless communication, and more particularly, to a method for a frame transmitted based on random access in a wireless local area network (LAN) system, and a wireless terminal using the method.

Related Art

A next-generation WLAN is aimed at 1) improving Institute of Electrical and Electronics Engineers (IEEE) 802.11 physical (PHY) and medium access control (MAC) layers in bands of 2.4 GHz and 5 GHz, 2) increasing spectrum efficiency and area throughput, and 3) improving performance in actual indoor and outdoor environments, such as an environment in which an interference source exists, a dense heterogeneous network environment, and an environment in which a high user load exists.

In the next-generation WLAN, a dense environment having a great number of access points (APs) and stations (STAs) is primarily considered. Discussions have been conducted on improvement in spectrum efficiency and area throughput in this dense environment. The next-generation WLAN pays attention to actual performance improvement not only in an indoor environment but also in an outdoor environment, which is not significantly considered in the existing WLAN.

Specifically, scenarios for a wireless office, a smart home, a stadium, a hotspot, and the like receive attention in the next-generation WLAN. Discussions are ongoing on improvement in the performance of a WLAN system in the dense environment including a large number of APs and STAs based on relevant scenarios.

SUMMARY OF THE INVENTION

The present specification aims to provide a method for a frame transmitted based on random access in a wireless local area network (LAN) system, and a wireless terminal using the method.

The present specification relates to a method for a frame transmitted based on random access in a wireless LAN system. A method for a frame transmitted based on random access in a wireless LAN system according to the present embodiment includes: receiving, by a user station (STA), a trigger frame including identification information for the random access and resource information indicating a random access resource unit corresponding to the identification information from an access point (AP); performing, by the user STA, a countdown operation for the random access resource unit; and transmitting, by the user STA, a first uplink frame including buffer status information associated with a traffic buffered in the user STA to the AP on the basis of the random access resource unit acquired through the countdown operation, wherein the first uplink frame is a frame which solicits acknowledge of the AP.

According to an embodiment of the present specification, provided are a method for a frame transmitted based on random access in a wireless local area network (LAN) system having improved performance, and a wireless terminal using the method.

DESCRIPTION OF EXEMPLARY EMBODIMENTS

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also includes complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

Figure 1:
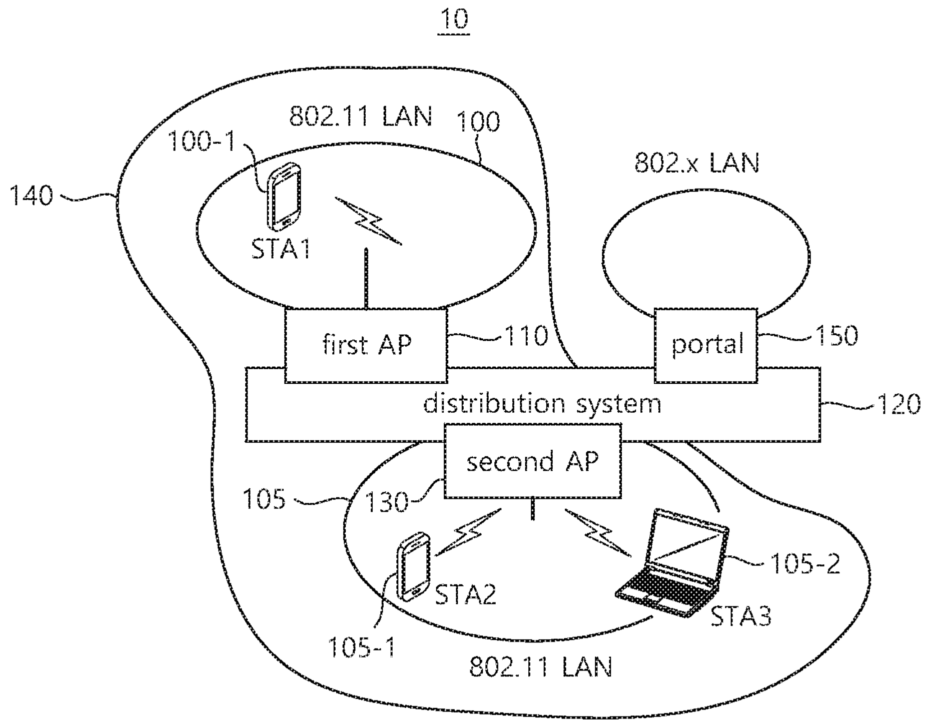
FIG. 1 is a conceptual view illustrating the structure of a wireless local area network (WLAN).
Figure 1:
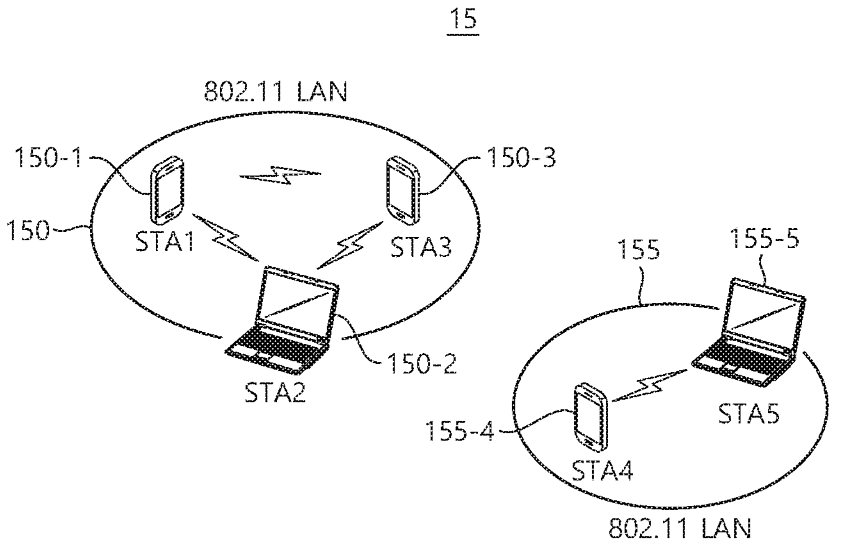

FIG. 1 is a conceptual view illustrating the structure of a wireless local area network (WLAN). FIG. 1(A) illustrates the structure of an infrastructure basic service set (BSS) of institute of electrical and electronic engineers (IEEE) 802.11.

Referring the FIG. 1(A), the WLAN system 10 of the FIG. 1(A) may include one or more infrastructure BSSs 100 and 105 (hereinafter, referred to as BSS). The BSSs 100 and 105 as a set of an access point (hereinafter, referred to as AP) and a station (hereinafter, referred to STA) such as an AP 110 and a STA1 100-1 which are successfully synchronized to communicate with each other are not concepts indicating a specific region.

For example, the BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 110, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the WLAN network (IEEE 802.11) and another network (e.g., 802.X).

In the BSS illustrated in the FIG. 1(A), a network between the APs 110 and 130 and a network between the APs 110 and 130 and the STAs 100-1, 105-1, and 105-2 may be implemented.

FIG. 1(B) illustrates a conceptual view illustrating the IBSS. Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1(B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner.

In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
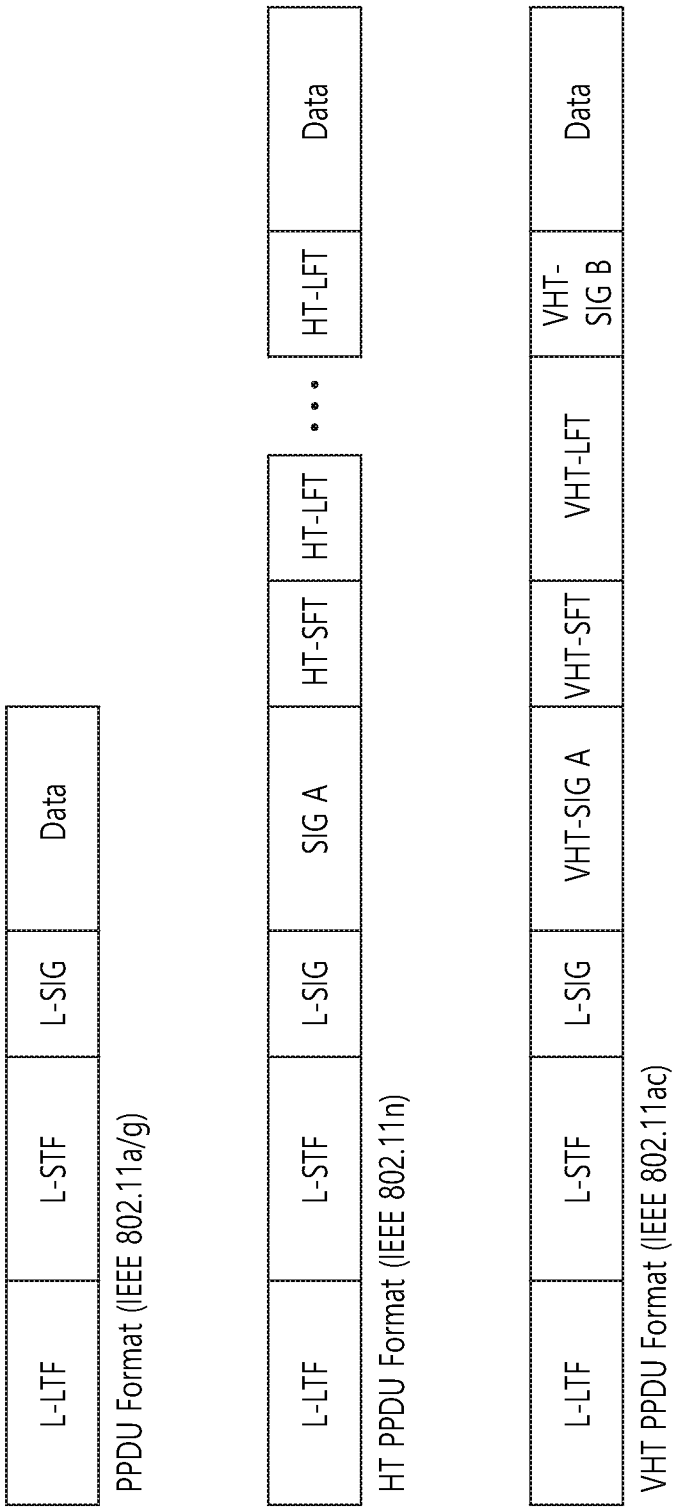
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
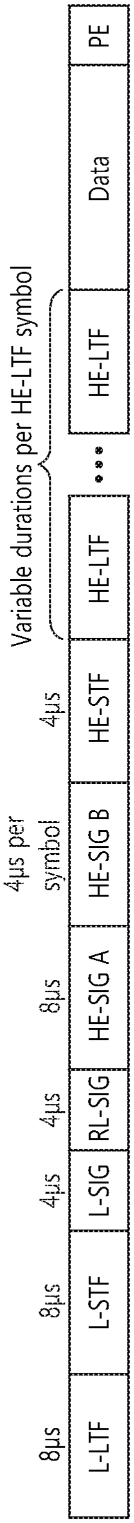
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs). More detailed description of the respective fields of FIG. 3 will be made below.

Figure 4:
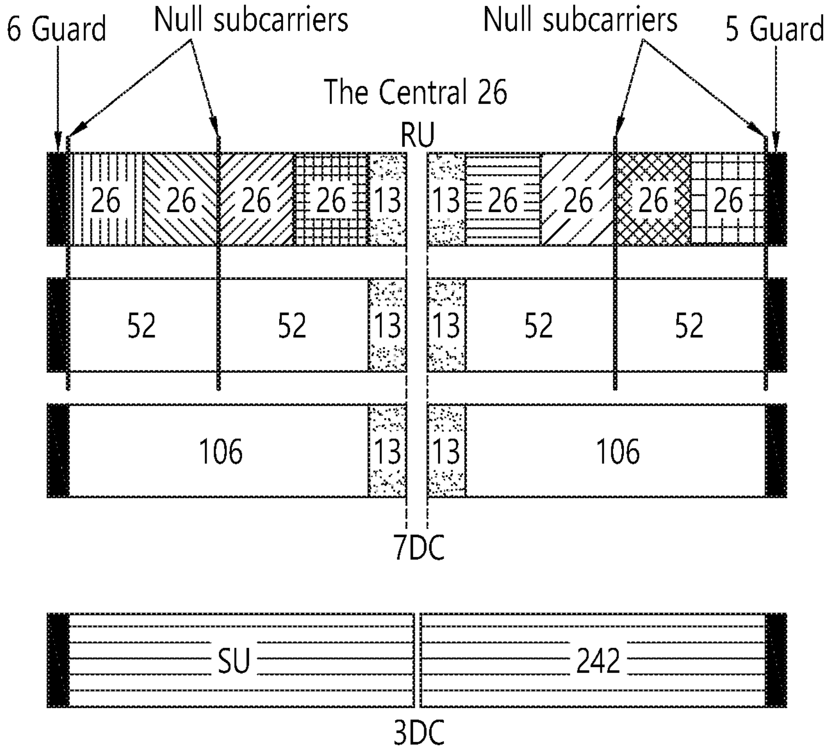
FIG. 4 is a diagram illustrating a layout of resource units used in a band of 20 MHz.

FIG. 4 is a diagram illustrating a layout of resource units (RUs) used in a band of 20 MHz. As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
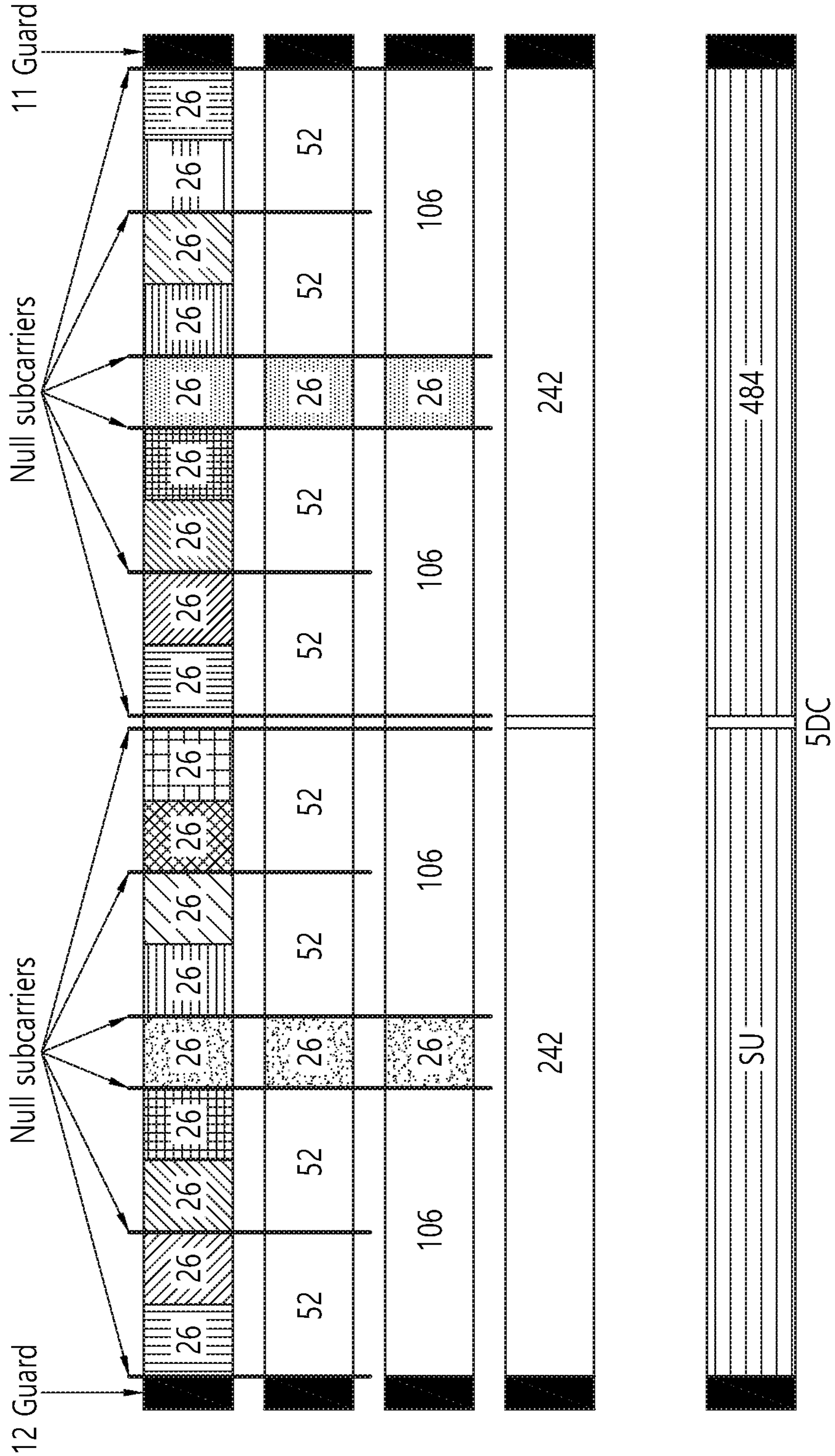
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
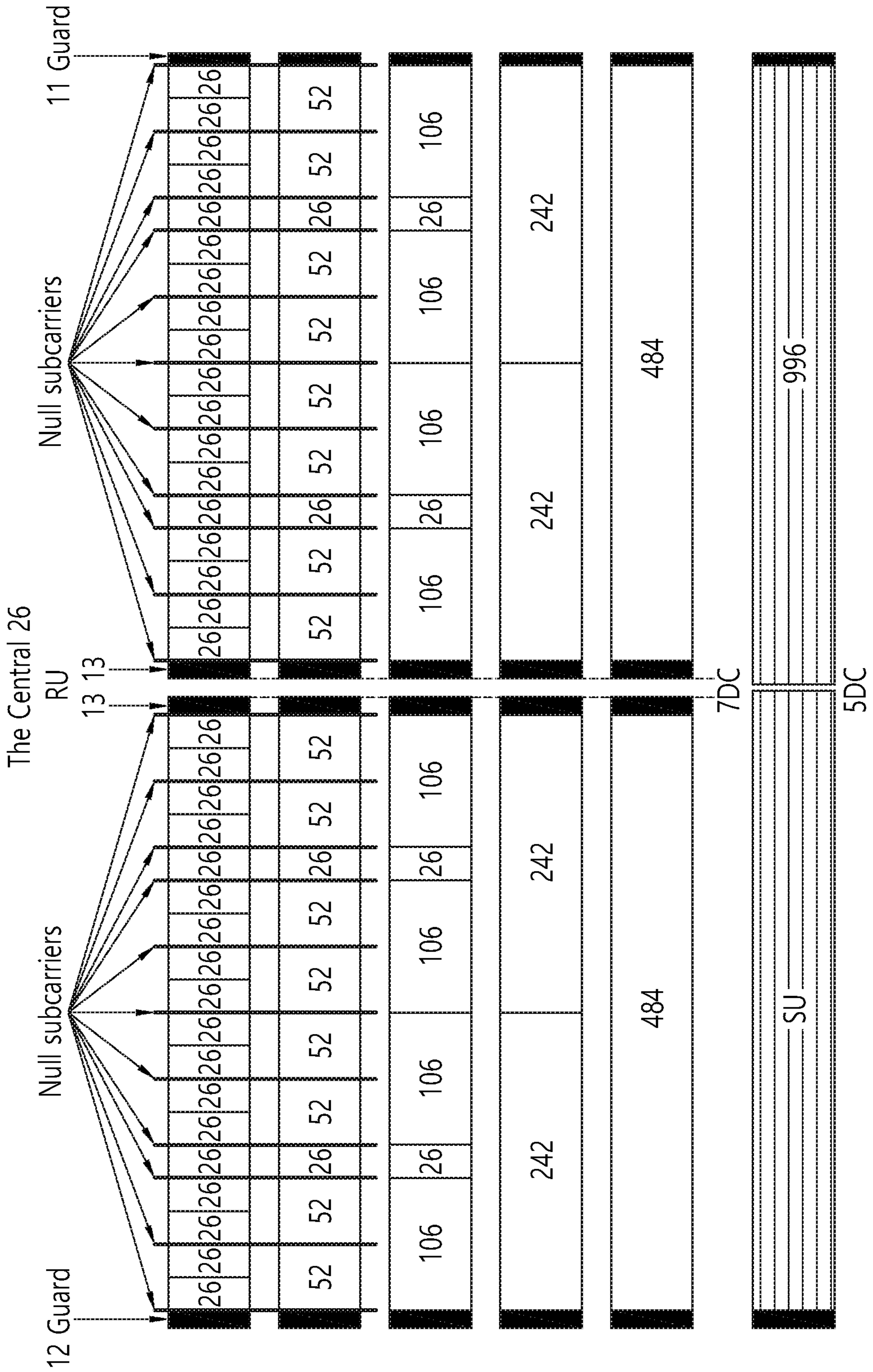
FIG. 6 is a diagram illustrating a layout of resource units used in a band of 80 MHz.

FIG. 6 is a diagram illustrating a layout of resource units (RUs) used in a band of 80 MHz.

Figure 26:
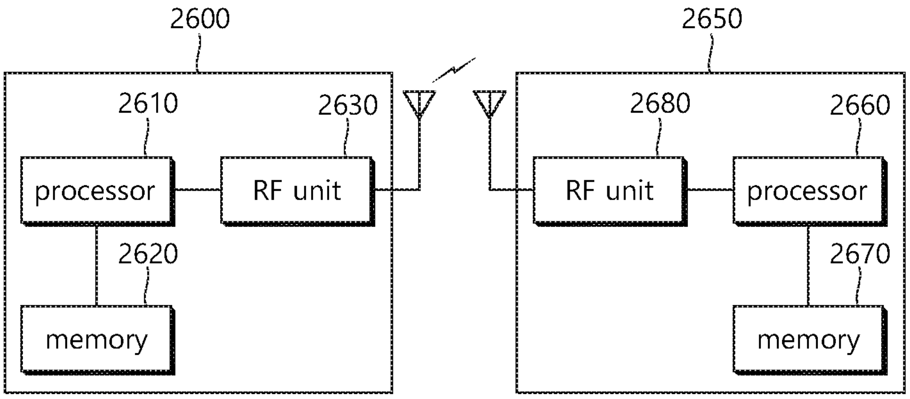
FIG. 26 is a block view illustrating a wireless device to which the exemplary embodiment of the present invention can be applied.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
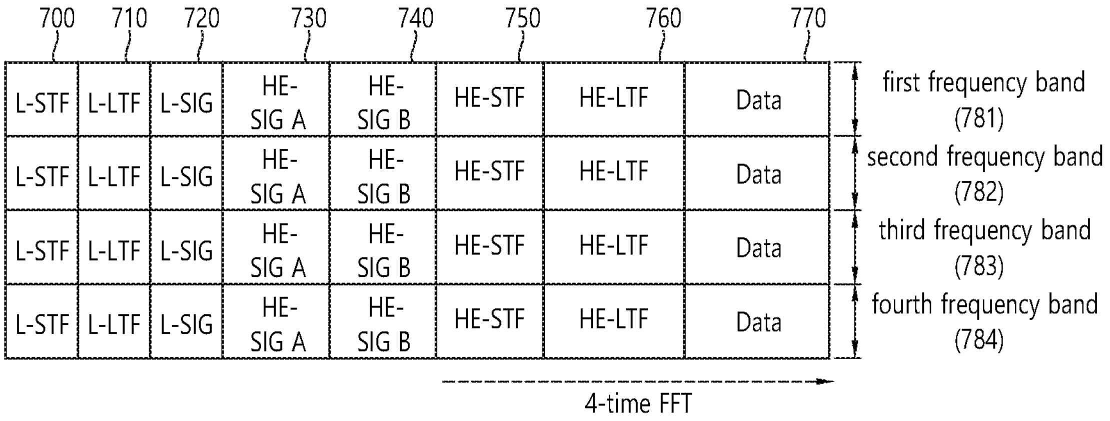
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (e.g., may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA. The HE-SIG-B 740 will be described below in a greater detail with reference to FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy WLAN system. That is, the FFT/IFFT having the size may be applied, which is N(=4) times larger than the first field of the HE PPDU.

For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy WLAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N(=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4(=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a term called downlink data (alternatively, a downlink frame), and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the WLAN system to which the embodiment of the present description is applied, the whole bandwidth may be used for downlink transmission to one STA and uplink transmission to one STA. Further, in the WLAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the WLAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the WLAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the WLAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy WLAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy WLAN system, the primary channel rule used for allocating the multiple channels may be a large limit in obtaining a high throughput by operating the wider bandwidth in a current WLAN environment in which the OBSS is not small.

In order to solve the problem, in the embodiment, a WLAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
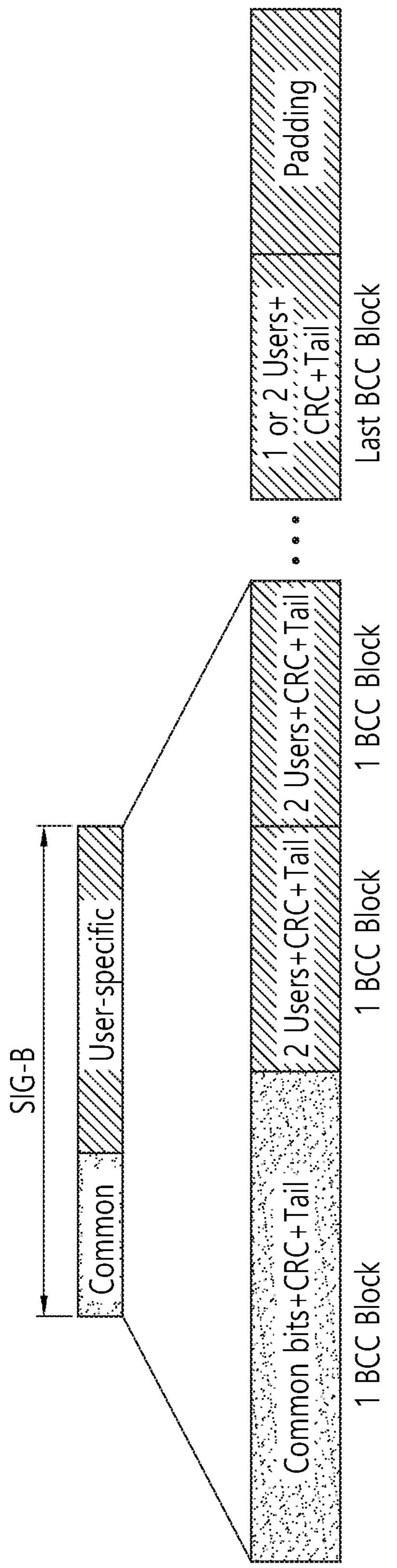
FIG. 8 is a block diagram illustrating one example of HE-SIG-B.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the “user-specific field” for 2 users and a CRC field corresponding thereto as illustrated in FIG. 8.

Figure 9:
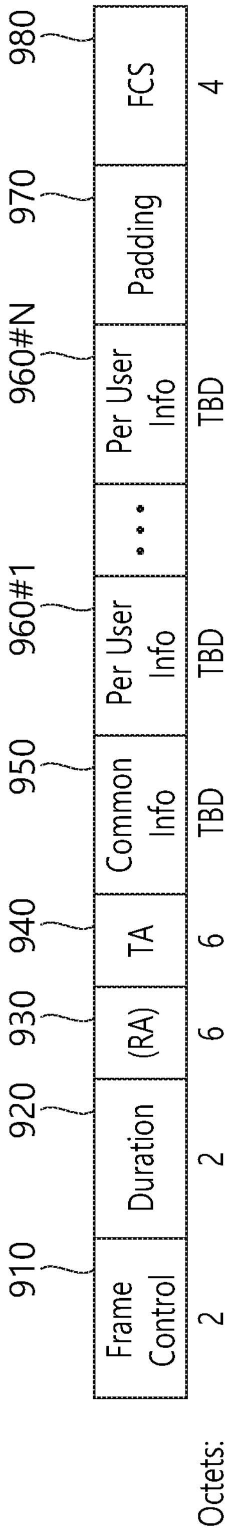
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960# N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960# N shown in FIG. 9 further includes multiple sub-fields.

Figure 10:
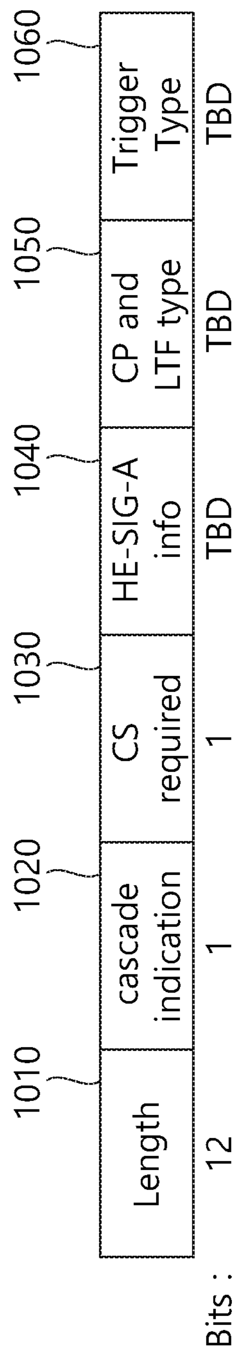
FIG. 10 illustrates an example of a sub-field included in a per user information field.

FIG. 10 illustrates an example of a sub-field included in a common information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
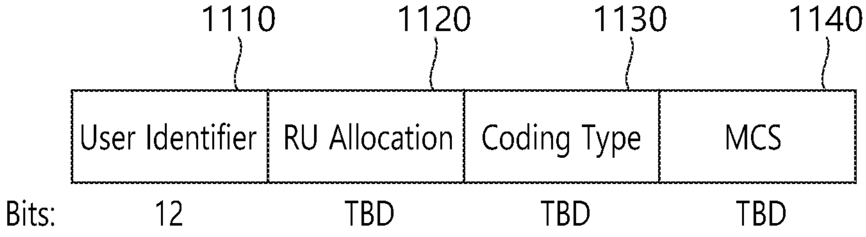
FIG. 11 illustrates an example of a sub-field being included in a per user information.

FIG. 11 illustrates an example of a sub-field being included in a per user information field. Among the sub-fields of FIG. 11, some (or part) of the sub-fields may be omitted, and other additional sub-fields may also be added. Additionally, the length of each of the sub-fields shown in the drawing may be varied.

A User Identifier field (1110) of FIG. 11 indicates an identifier of an STA (i.e., receiving STA) to which the per user information corresponds, and an example of the identifier may correspond to all or part of the AID.

Additionally, a RU Allocation field (1120) may be included in the sub-field of the per user information field. More specifically, in case a receiving STA, which is identified by the User Identifier field (1110), transmits an uplink PPDU in response to the trigger frame of FIG. 9, the corresponding uplink PPDU is transmitted through the RU, which is indicated by the RU Allocation field (1120). In this case, it is preferable that the RU that is being indicated by the RU Allocation field (1120) corresponds to the RU shown in FIG. 4, FIG. 5, and FIG. 6.

The sub-field of FIG. 11 may include a Coding Type field (1130). The Coding Type field (1130) may indicate a coding type of the uplink PPDU being transmitted in response to the trigger frame of FIG. 9. For example, in case BBC coding is applied to the uplink PPDU, the Coding Type field (1130) may be set to '1', and, in case LDPC coding is applied to the uplink PPDU, the Coding Type field (1130) may be set to '0'.

Additionally, the sub-field of FIG. 11 may include an MCS field (1140). The MCS field (1140) may indicate an MCS scheme being applied to the uplink PPDU that is transmitted in response to the trigger frame of FIG. 9.

Figure 12:
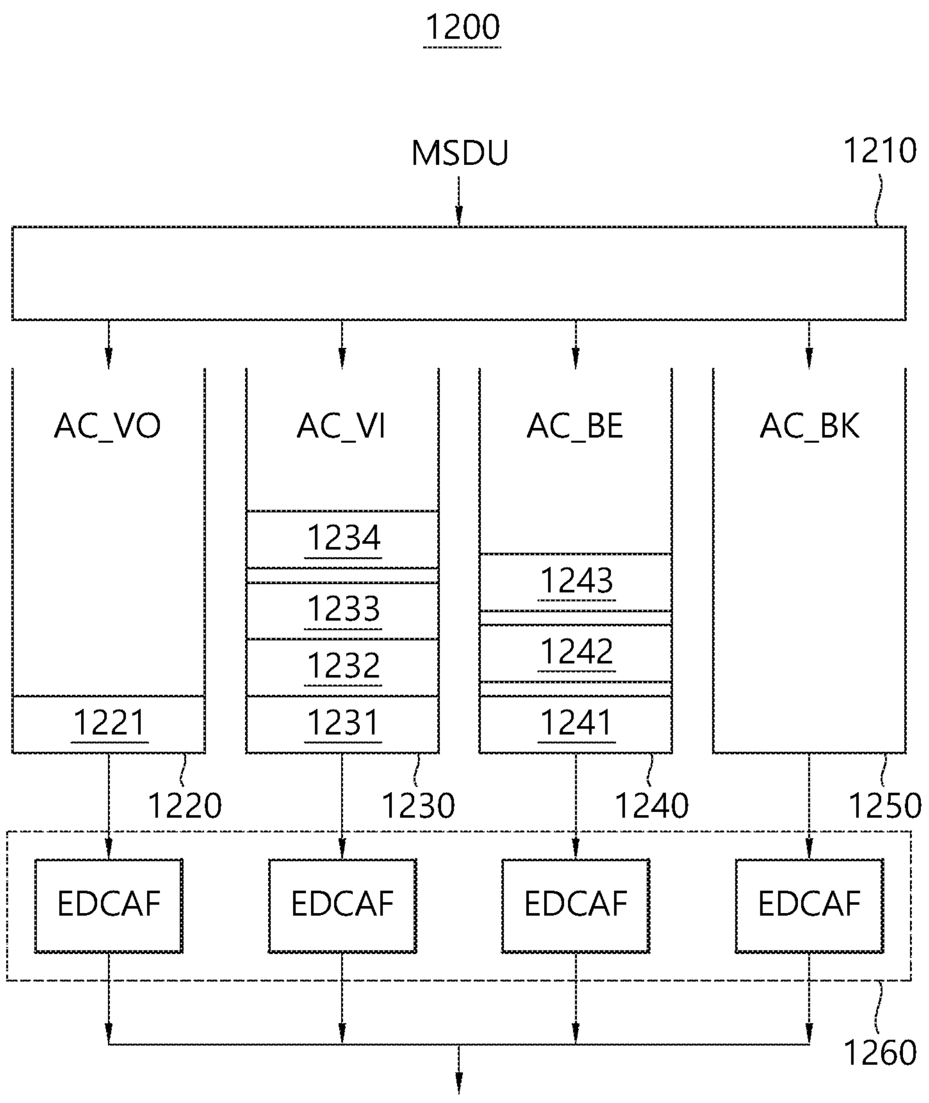
FIG. 12 is a concept view showing inside of an STA for performing an EDCA procedure in a wireless LAN system of the present embodiment.

FIG. 12 is a concept view showing inside of an STA for performing an EDCA procedure in a wireless LAN system of the present embodiment.

In the wireless LAN system, an STA (or AP) may perform an enhanced distributed channel access (EDCA) procedure on the basis of a plurality of user priorities pre-defined for buffered traffic data. For example, the buffered traffic data may be a quality of service (QoS) frame based on the plurality of user priorities.

Four access categories (ACs) for the EDCA procedure may be defined as AC_BK(background), AC_BE(best effort), AC_VI(video), and AC_VO(voice).

An STA which performs the EDCA procedure may map traffic data, i.e., a MAC service data unit (MSDU), which arrives at a medium access control (MAC) layer from a logical link control (LLC) layer, to a specific AC as shown in Table 1 below. Table 1 is an exemplary table showing mapping between the user priority and the AC.

TABLE 1

| priority | user priority | AC (access category) |
|---|---|---|
| low | 1 | AC_BK |
| | 2 | AC_BK |
| | 0 | AC_BE |
| | 3 | AC_BE |
| | 4 | AC_VI |
| | 5 | AC_VI |
| | 6 | AC_VO |
| high | 7 | AC_VO |

In the present embodiment, a transmission queue and a channel access parameter set may be defined for each AC. The plurality of user priorities may be implemented based on the channel access parameter set which is set differently for each AC.

In order to transmit a frame buffered in a transmission queue corresponding to each AC, the STA (or AP) may use a channel access parameter set (e.g., arbitration interframe space (AIFS)[AC], CWmin[AC], and CWmax[AC]) based on the present embodiment instead of the conventional parameter set (e.g., DCF interframe space (DIFS), CWmin, and CWmax) based on the conventional distributed coordination function (DCF).

An EDCA parameter set element may be an important means used to differentiate channel access of an STA which transmits a QoS traffic having a different user priority. For example, the lower the values of AIFS[AC] and CWmin [AC] corresponding to each AC, the shorter the delay time for channel access. Accordingly, a differentiated user priority can be implemented.

For example, an EDCA parameter set element included in a beam frame may include a channel access parameter (i.e., AIFS [AC], CWmin[AC], CWmax[AC]) for each AC. For another example, the channel access parameter set used for each AC may be set to a default value in the STA.

To determine a traffic to be transmitted by the STA, a differentiated backoff procedure may be performed individually for each AC. Proper setting of the channel access parameter set for each AC may result in an increase in transmission performance according to a priority of the traffic while optimizing network performance.

In the present specification, a user priority predefined for traffic data (or traffic) may be referred to as a traffic identifier (TID). A transmission priority of traffic data may be determined based on the user priority.

Referring to Table 1 above, a TID of traffic data having a highest user priority may be set to '7'. That is, the traffic data of which the TID is set to '7' may be understood as a traffic having a highest priority.

Referring to FIG. 12, one STA (or AP) 1200 may include a virtual mapper 1210, a plurality of transmission queues 1220 to 1250, and a virtual collision processor 1260.

The virtual mapper 1210 of FIG. 12 may map an MSDU received from a logical link control (LLC) layer to a transmission queue corresponding to each AC according to Table 1 above.

For example, the AC VO type transmission queue 1220 of FIG. 12 may include one frame 1221 for a 2nd STA (not shown). The AC VI type transmission queue 1230 may include three frames 1231 to 1233 for a 1st STA (not shown) and one frame 1234 for a 3rd STA (not shown) according to an order of transmission to a physical layer.

The AC BE type transmission queue 1240 of FIG. 12 may include one frame 1241 for the 2nd STA (not shown), one frame 1242 for the 3rd STA (not shown), and one frame 1243 for the 2nd STA (not shown) according to the order of transmission to the physical layer.

For example, if there is no frame buffered in the AC BE type transmission queue 1250 of FIG. 12, the AC BE type transmission queue 1250 may not include a frame to be transmitted to the physical layer.

The plurality of transmission queues 1220 to 1250 of FIG. 12 may operate as an individual contention entity of an EDCA procedure inside an STA to determine a traffic to be transmitted through a wireless medium in one STA (or AP).

Specifically, the AC VO type transmission queue 1220, AC VI type transmission queues 1230, and AC BE type transmission queue 1240 in which a traffic buffered in the transmission queue of FIG. 12 is present may be understood as an individual contention entity of the EDCA procedure.

That is, the AC VO type transmission queue 1220, the AC VI type transmission queue 1230, and the AC BE type transmission queue 1240 may perform the EDCA procedure on the basis of a channel access parameter set (e.g., AIFS [AC], CWmin[AC], CWmax[AC]) for each AC.

In this case, a specific transmission queue which has acquired channel access through the EDCA procedure inside the STA may be referred to as a primary AC. A traffic included in the primary AC may be transmitted to another entity (e.g., another STA or AP) during a transmission opportunity (hereinafter, TXOP).

If two or more ACs in which backoff is complete are present inside the STA, a collision between the ACs may be adjusted through a virtual collision handler 1260 inside the STA.

For example, if the collision occurs between the ACs, a frame buffered in an AC having a higher priority may be first transmitted. In addition, other ACs may increase a contention window value, and may update a value which is set in a backoff counter.

The TXOP may start when the STA approaches to a wireless medium on the basis of a rule of the EDCA procedure. If two or more frames are included in one AC, when the TXOP is acquired by the STA, the STA may attempt to transmit a plurality of frames through a MAC layer.

In a state where the STA has already completed transmission of one frame, if it is determined that a next frame in the same AC is transmitted and up to ACK for this can be received during the remaining TXOP, the STA attempts to transmit a next frame after an SIFS time interval.

In addition, a TXOP limit value may be set to a default value in the AP and the STA, or a frame associated with the TXOP limit value may be delivered from the AP to the STA. If a size of a data frame to be transmitted exceeds the TXOP limit value, the STA may fragment the frame into several small frames. The fragmented frame may be transmitted in a range not exceeding the TXOP limit value.

During the STA transmits a frame, if a collision occurs with respect to another STA, a backoff procedure for generating a new backoff count value of the STA may be understood based on the conventional backoff procedure of a DCF.

In other words, each STA may individually determine a frame to be transmitted in each STA through an internal backoff procedure associated with a plurality of transmission queues. Each STA may set a backoff time in a backoff counter for each STA on the basis of the individually determined frame. Each STA may perform a contention-based back-off procedure with another STA on the basis of the backoff counter. In this case, an STA of which a backoff time of the backoff counter first becomes '0' may acquire a TXOP.

Figure 13:
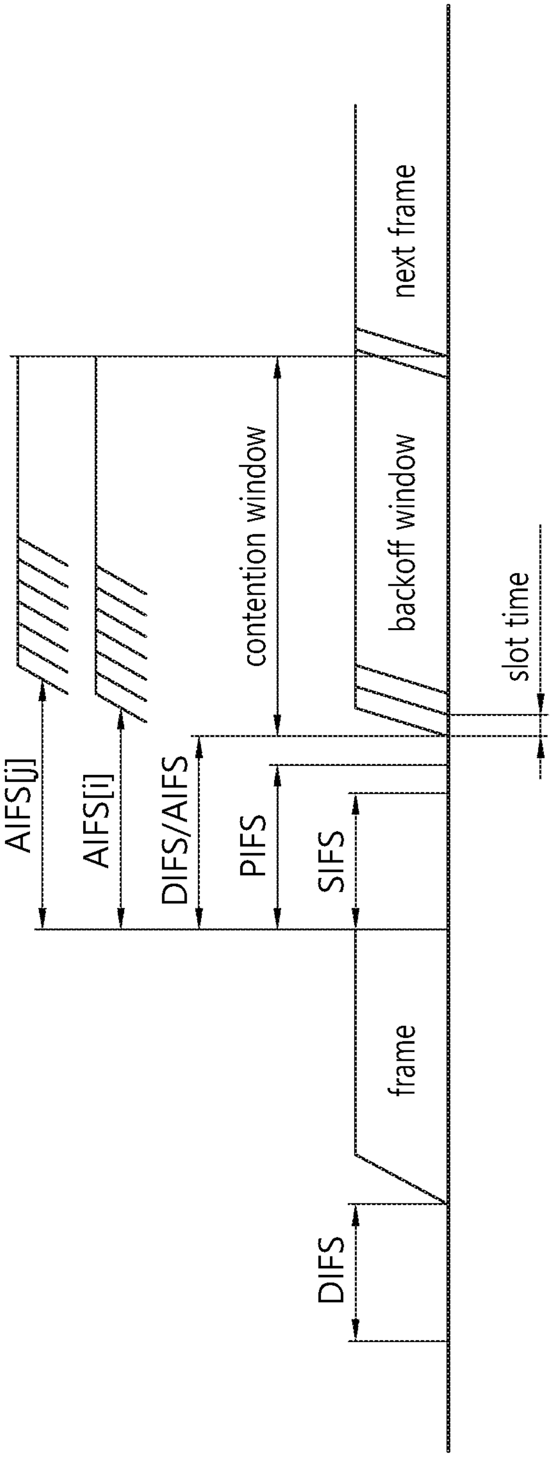
FIG. 13 is a concept view showing a backoff procedure according to an EDCA procedure of the present embodiment.

FIG. 13 is a concept view showing a backoff procedure according to an EDCA procedure of the present embodiment. Referring to FIG. 12 and FIG. 13, traffic data to be transmitted from an STA may be transmitted according to a contention-based EDCA procedure depending on a user priority. For example, a priority assigned to each traffic data may be set to any one of 8 user priorities of Table 1 above.

As described above, one STA (or AP) may include 4 output queues (i.e., transmission queues). Each output queue may individually perform a channel access operation according to a rule of the EDCA procedure. Each output queue may transmit traffic data on the basis of an arbitration interframe space (AIFS) differentiated according to a user priority instead of a DCF interframe space (DIFS) conventionally used.

When the STA (or AP) transmits a traffic having a different user priority at the same time, a wireless LAN system provides control to transmit the traffic in a descending order of a user priority, thereby minimizing occurrence of a collision between the STAs.

To start the EDCA procedure, each STA (or AP) may set a backoff time Tb[i] in a backoff timer. The backoff time Tb[i] may be calculated using Equation 1 below as a pseudo-random integer value.

$$T_b[i]=\text{Random}(i)\times\text{SlotTime} \quad \text{[Equation 1]}$$

Herein, Random(i) is a function which generates any integer between 0 and CW[i] by using a uniform distribution. CW[i] is a contention window between a minimum contention window CWmin[i] and a maximum contention window CWmax[i], and i may denote a traffic priority.

When an STA for performing the EDCA procedure transmits a frame, Equation 2 below may be used at the request of retransmission upon occurrence of a collision with respect to another STA. That is, whenever the collision occurs, a new contention window $CW_{new[i]}$ may be calculated by using an old window $CW_{old[i]}$.

$$CW_{new}[i]=((CW_{old}[i]+1)\times PF)-1 \quad \text{[Equation 2]}$$

Herein, the value PF may be calculated according to a procedure defined in the IEEE 802.11e standard. The values CWmin[i], CWmax[i], AIFS and PF included in a channel access parameter set may be set to a default value in each STA (or AP). Alternatively, the channel access parameter set may be received from the AP through a QoS parameter set element included in a management frame or a beam frame.

Hereinafter, in the present embodiment, a terminal may be a device capable of supporting both a wireless LAN system and a cellular system. That is, the terminal may be interpreted as a UE supporting the cellular system or an STA supporting the wireless LAN system.

In the present embodiment, the backoff procedure of the EDCA procedure may be performed on the basis of Equations 1 and 2 above.

For example, when the backoff procedure of the AC VI type transmission queue 1230 of FIG. 12 is first finished, the AC VI type transmission queue 1230 may acquire a transmission opportunity (TXOP) capable of accessing a wireless medium. The AP 1200 of FIG. 12 may determine the AC VI type transmission queue 1230 as a primary AC, and may determine the remaining transmission queues 1220, 1240, and 1250 as a secondary AC.

As such, a process of performing a backoff procedure for the plurality of transmission queues 1220 and 1250 and determining a transmission queue, of which the backoff procedure is first finished, as a primary AC may be referred to as a primary AC rule in the present specification.

A TXOP duration for a TXOP may be determined based on the primary AC determined by the primary AC rule. In addition, frames included in a secondary AC may be transmitted together in the TXOP duration determined based on the primary AC.

In addition, an EDCA procedure of a user STA may be enabled or disabled in a wireless LAN system according to the present embodiment. For example, whether the EDCA procedure is enabled may be determined in an association operation or negotiation operation between the STA and the AP. Alternatively, whether the EDCA procedure is enabled may be determined by the STA and thereafter may be signaled to the AP through a separate frame (e.g., an OMI frame).

Figure 14:
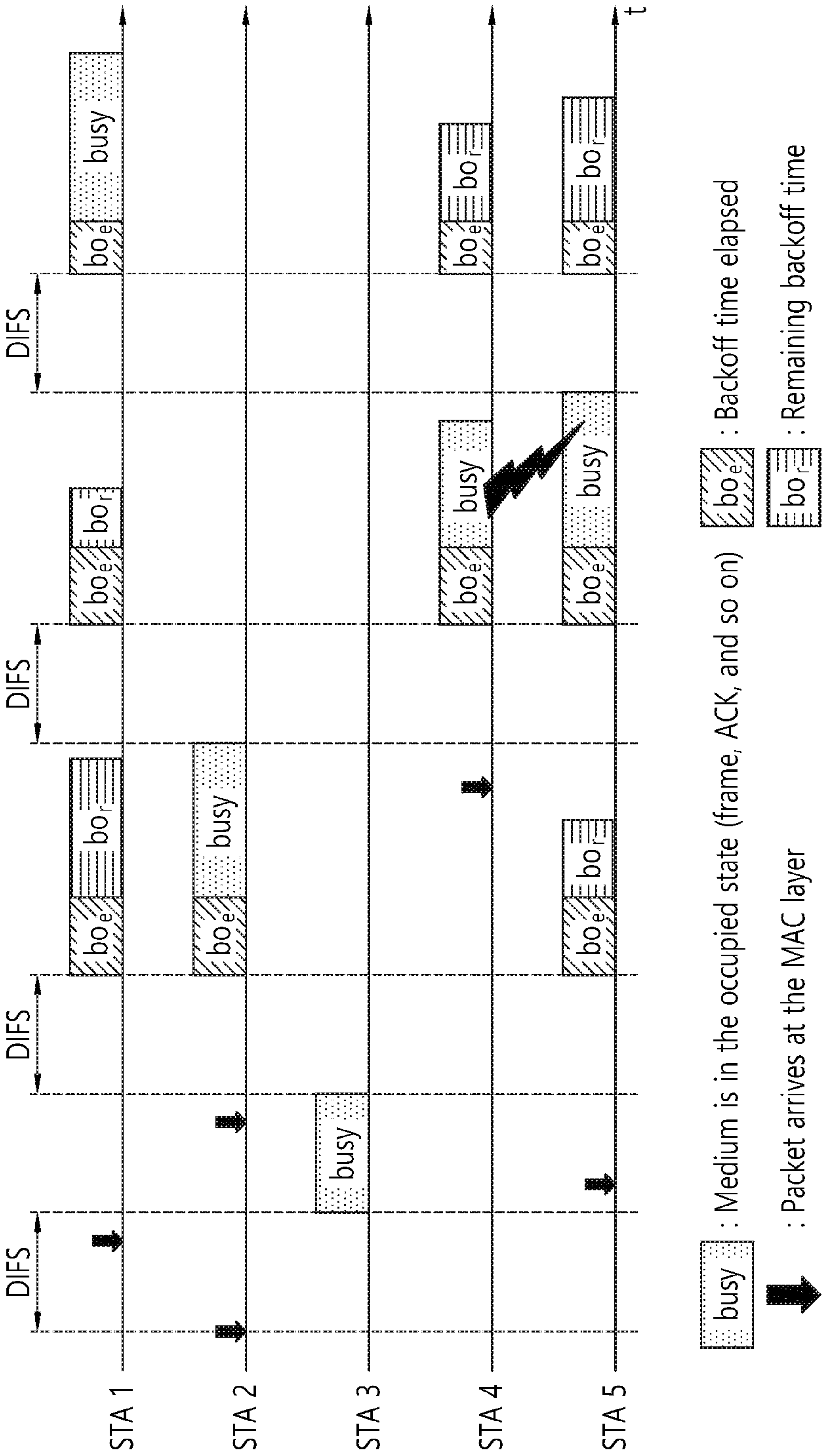
FIG. 14 is a diagram for explaining a backoff period and a frame transmission procedure in a wireless LAN system of the present specification.

FIG. 14 is a diagram for explaining a backoff period and a frame transmission procedure in a wireless LAN system of the present specification. Referring to FIG. 14, horizontal axes t1 to t5 for $1^{st}$ to $5^{th}$ STAs 1410 to 1450 may represent time axes. In addition, vertical axes for $1^{st}$ to $5^{th}$ STAs 1410 to 1450 may represent a backoff time for transmission.

Referring to FIG. 13 and FIG. 14, when a specific medium is changed from an occupy (or busy) state to an idle state, a plurality of STAs may attempt data (or frame) transmission.

In this case, as a method for minimizing a collision between STAs, each STA may select a backoff time Tb[i] of Equation 1 and may attempt transmission after waiting for a corresponding time slot.

When the backoff procedure is initiated, each STA may count down a selected backoff count time on a slot time basis. Each STA may continuously monitor a medium during the countdown. When the medium is monitored in the busy state, the STA may stop the countdown and wait. When the medium is monitored in the idle state, the STA resumes the countdown.

Referring to FIG. 14, when a frame for a $3^{rd}$ STA 1430 arrives at a MAC layer of the $3^{rd}$ STA 1430, the $3^{rd}$ STA 1430 may verify whether the medium is in the idle state during a DIFS. Subsequently, if it is determined that the medium is in the idle state during the DIFS, the $3^{rd}$ STA 1430 may transmit a frame to an AP (not shown). However, although an inter frame space (IFS) is illustrated as the DIFS, it is to be understood that the present specification is not limited thereto.

During a frame is transmitted from the $3^{rd}$ STA 1430, the remaining STAs may verify the busy state of the medium, and may wait for a transmission duration of the frame. The frame may arrive at a MAC layer of each of the $1^{st}$ STA 1410, the $2^{nd}$ STA 1420, and the $5^{th}$ STA 1450. If it is verified that the medium is in the idle state, each STA may wait for the DIFS, and thereafter each STA may count down an individual random backoff time selected by each STA.

Referring to FIG. 14, the $2^{nd}$ STA 1420 selects a shortest backoff time, and the $1^{st}$ STA 1410 selects a greatest backoff count value. A remaining backoff time of the $5^{th}$ STA 1450 is shorter than a remaining backoff time of the $1^{st}$ STA 1410 at a time at which the $2^{nd}$ STA 1420 finishes a backoff procedure for the selected random backoff time and starts frame transmission.

When the medium is occupied by the $2^{nd}$ STA 1420, the $1^{st}$ STA 1410 and the $5^{th}$ STA 1450 may suspend the backoff procedure and waits. Subsequently, when the medium occupancy of the $2^{nd}$ SAT 1420 is finished (that is, when the medium returns to the idle state), the $1^{st}$ STA 1410 and the $5^{th}$ STA 1450 may wait for the DIFS.

Subsequently, the $1^{st}$ STA 1410 and the $5^{th}$ STA 1450 may resume the backoff procedure on the basis of the suspended remaining backoff time. In this case, since a remaining backoff time of the $5^{th}$ STA 1450 is shorter than a remaining backoff time of the $1^{st}$ STA 1410, the $5^{th}$ STA 1450 may finish the backoff procedure prior to the $1^{st}$ STA 1410.

Meanwhile, referring to FIG. 14, when a medium is occupied by the $2^{nd}$ STA 1420, a frame for the $4^{th}$ STA 1440 may arrive at a MAC layer of the $4^{th}$ STA 1440. When the medium is in the idle state, the $4^{th}$ STA 1440 may wait for the DIFS. Subsequently, the $4^{th}$ STA 1440 may count down a backoff time selected by the $4^{th}$ STA 1440.

Referring to FIG. 14, a remaining backoff time of the $5^{th}$ STA 1450 may incidentally coincide with a random backoff time of the $4^{th}$ STA 1440. In this case, a collision may occur between the $4^{th}$ STA 1440 and the $5^{th}$ STA 1450. When the collision occurs between the STAs, both the $4^{th}$ STA 1440 and the $5^{th}$ STA 1450 cannot receive ACK, which may lead to a failure in data transmission.

Accordingly, the $4^{th}$ STA 1440 and the $5^{th}$ STA 1450 may calculate a contention window $CW_{new}[i]$ according to Equa tion 2 above. Subsequently, each of the 4$^{th}$ STA 1440 and the 5$^{th}$ STA 1450 may individually count down a random backoff time newly calculated according to Equation 2 above.

Meanwhile, the 11$^{st}$ STA 1410 may wait when a medium is in the busy state due to transmission of the 4$^{th}$ STA 1440 and the 5$^{th}$ STA 1450. Subsequently, when the medium is in the idle state, the 1$^{st}$ STA 1410 may resume backoff counting after waiting for the DIFS. The 1$^{st}$ STA 1410 may transmit a frame at the expiry of the remaining backoff time of the 1$^{st}$ STA 1410.

A CSMA/CA mechanism may also include virtual carrier sensing in addition to physical carrier sensing, wherein the AP and/or STA directly senses the medium.

Virtual carrier sensing is performed to compensate problems that may occur during medium access, such as a hidden node problem, and so on. In order to perform virtual carrier sensing, a MAC of the WLAN system uses a Network Allocation Vector (NAV). The NAV corresponds to a value that is indicated by an AP and/or an STA that is currently using the medium or that has the authority to use the medium to another AP and/or STA, wherein the value indicates the time remaining until the medium returns to its state of being available for usage.

Accordingly, a value that is set as the NAV corresponds to a time period during which the usage of the medium is scheduled by the AP and/or STA, which transmits the corresponding frame, and the STA receiving the NAV value is prohibited from accessing the medium during the corresponding time period. For example, the NAV may be configured in accordance with a value of the duration field of the MAC header of the corresponding frame.

Figure 15:
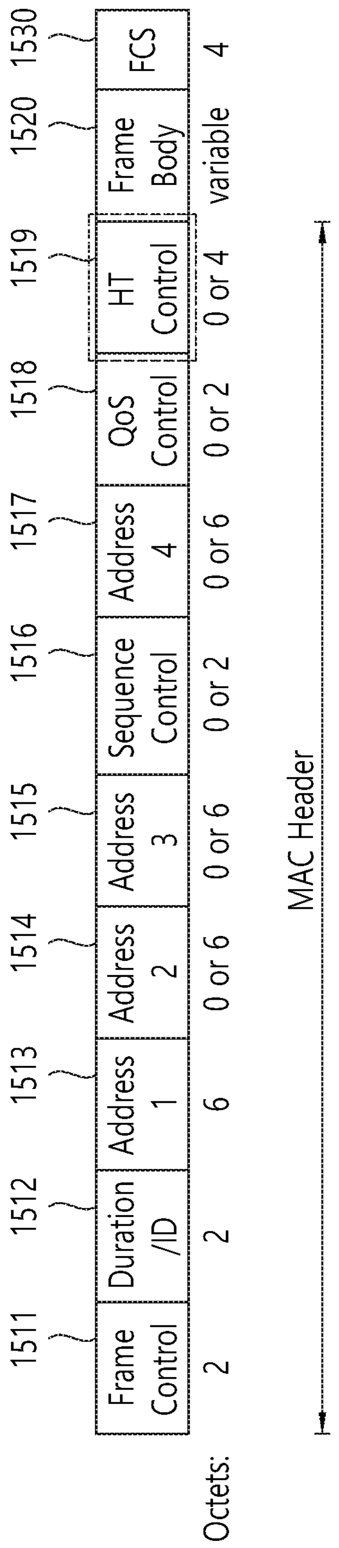
FIG. 15 shows an example of a MAC frame including buffer status information and an ACK policy indicator according to the present embodiment.

FIG. 15 shows an example of a MAC frame including buffer status information and an ACK policy indicator according to the present embodiment.

A MAC frame 1500 according to the present embodiment may include a plurality of fields 1511 to 1519 constituting a MAC header, a frame body field 1520 including a payload and having a variable length, and an FCS field 1530 for error detection of a receiving terminal.

The frame control field 1511, duration/ID field 1512, first address field 1513, and FCS field 1530 of the MAC header may be fields included in all types of the MAC frame.

For example, the MAC frame 1500 may be a management frame (e.g., a beacon frame), a control frame (e.g., an RTS/CTS frame), or a data frame (e.g., a QoS data frame including a payload, a QoS null frame not including the payload) according to information included in the frame control field 1511.

In addition, the second address field 1514, the third address field 1515, the sequence control field 1516, the fourth address field 1517, the QoS control field 1518, the HT control field 1519, and the frame body field 1520 may be included selectively according to a type of the MAC frame.

For example, when the QoS data frame or the QoS null frame are indicated by the frame control field 1511, the QoS control field 1518 may be included in the MAC frame 1500.

The QoS control field 1518 may consist of 2 octets (16 bits). Specifically, the QoS control field 1518 may be configured by Table 2 below.

TABLE 2

| Applicable Frame (sub) types | Bits 0-3 | Bit 4 | Bits 5-6 | Bit 7 | Bit 8 | Bit 9 | Bit 10 | Bits 11-15 |
|---|---|---|---|---|---|---|---|---|
| QoS Data and QoS Data + CF-Ack frames sent by | TID | 0 | Ack Policy | A-MSDU Present | TXOP Duration Requested | | | |
| non-AP STAs that are not a TPU buffer STA or a TPU sleep STA in a nonmesh BS5 | TID | 1 | Ack Policy | A-MSDU Present | Queue Size | | | |
| QoS Null frames sent by non-AP STAs that are not | TID | 0 | Ack Policy | Reserved | TXOP Duration Requested | | | |
| TPU buffer STA or a TPU sleep STA in a nonmesh BS5 | TID | 1 | Ack Policy | Reserved | Queue Size | | | |

Referring to Table 2, 1$^{st}$ to 4$^{th}$ bits (i.e., bits 0 to 3) may be a region for traffic identifier (TID) information. User priorities 0 to 7 for the TID may be mapped to values expressed through the 1$^{st}$ to 4$^{th}$ bits (i.e., bits 0 to 3). Values '8' to '15' which are the remaining values that can be expressed by the 1$^{st}$ to 4$^{th}$ bits (i.e., bits 0 to 3) may be reserved values.

That is, an STA (or AP) may report a TID of a traffic buffered in the STA through the 1$^{st}$ to 4$^{th}$ bits (i.e., bits 0 to 3) of the QoS control field 1518.

If the 5$^{th}$ bit (i.e., bit 4) of the QoS control field 1518 is set to '0', 9$^{th}$ to 16$^{th}$ bits (i.e., bits 8 to 15) of the QoS control field 1518 may be associated with a TXOP duration of the STA.

In addition, if the 5$^{th}$ bit (i.e., bit 4) of the QoS control field 1518 is set to '1', the 9$^{th}$ to 16$^{th}$ bits (i.e., bits 8 to 15) of the QoS control field 1518 may indicate queue size information of a traffic buffered in a transmission queue of the STA.

Hereinafter, for clear and concise description of the present specification, it may be understood that buffer status information regarding a traffic buffered in the STA is information included in a QoS null frame not including a payload.

In the present specification, the buffer status information is delivered to an AP through not the QoS control field 1518 but the HT control field 1519. Therefore, it may be understood that the 5$^{th}$ bit (i.e., bit 4) of the QoS control field 1518 based on Table 2 above is set to '0'.

The 6$^{th}$ and 7$^{th}$ bits (i.e., bits 5 and 6) of the QoS control field 1518 may be a region for an ACK policy indicator. The ACK policy indicator according to the present embodiment may be configured as shown in Table 3 below

TABLE 3

| Bits 5-6 | Meaning |
|---|---|
| 00 | Normal Ack or Implicit Block Ack Request<br>QoS Data in non A-MPDU: The addressed recipient returns an ACK or QoS +CF-Ack frame.<br>QoS Data in A-MPDU: The addressed recipient returns a BA. |

TABLE 3-continued

| Bits 5-6 | Meaning |
|---|---|
| 10 | No Ack<br>The addressed recipient does not return an ACK. This is used when the sender does not require acknowledgement for the unicast frame sent or when the frame sent is a broadcast or multicast frame. |
| 01 | No Explicit Acknowledgement or Scheduled Ack under PSMP<br>There may be a response frame to the frame that is received but it is neither an ACK nor any data frame of subtype +CF-Ack. QoS CF-Poll and QoS CF-Ack+CF-Poll frames always use this value. Under PSMP, this value indicates a scheduled acknowledgement in the next PSMP-DTT or PSMP-UTT. |
| 11 | Block Acknowledgement<br>The addressed recipient takes no action upon receipt of the frame except for recording the state. The recipient can expect a BAR frame or A-MPDU containing QoS Data frame(s) with Normal Ack ack policy in the future. |

For example, a transmitting terminal of the MAC frame 1500 may allow an ACK frame to be solicited from a receiving terminal (i.e., recipient) of the MAC frame 1500 on the basis of an ACK policy indicator (i.e., bits 5 and 6) indicated by '00'.

For another example, the transmitting terminal of the MAC frame 1500 may allow an ACK frame to be unsolicited from the receiving terminal (i.e., recipient) of the MAC frame 1500 on the basis of an ACK policy indicators (i.e., bits 5 and 6) indicated by '10'.

The STA according to the present embodiment may inform the AP of queue size information (e.g., buffer status information) of a plurality of traffics buffered in the STA on the basis of the HT control field 1519 of the MAC frame 1500. A method of reporting the buffer status information regarding the plurality of traffics to the AP is described in greater detail with reference to the accompanying drawing according to the present embodiment.

Figure 16:
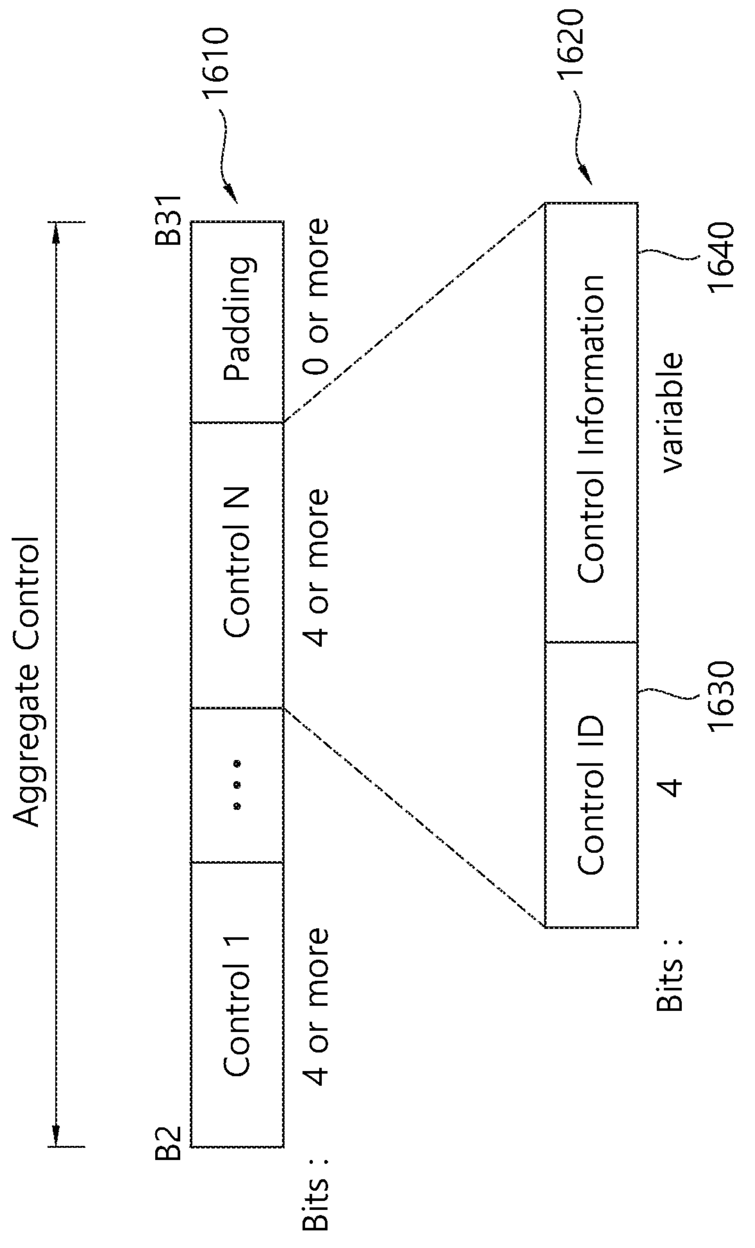
FIG. 16 shows an exemplary format of an A-control field for buffer status information according to the present embodiment.

FIG. 16 shows an exemplary format of an A-control field for buffer status information according to the present embodiment. Referring to FIG. 1 to FIG. 16, an A-control field 1610 of FIG. 16 may be a field corresponding to the HT control field 1519 of FIG. 15.

Specifically, the A-control field 1610 may consist of 4 octets (i.e., 32 bits). If 1st and 2$^{nd}$ bits (i.e., B0 and B1, not shown) of the HT control field 1519 of FIG. 15 is set to '11', the remaining bits (i.e., B2 to B31) may be allocated for the A-control field 1610 of FIG. 16.

The A-control field 1610 may include at least one control sub-field (i.e., Control 1, . . . , Control N). For example, an N$^{th}$ control sub-field (i.e., Control N) 1620 may include a control ID sub-field 1630 having a length of 4 bits and a control information sub-field 1640 having a variable length.

The control ID sub-field 1630 may indicate a type of information included in the control information sub-field 1640. The control information sub-field 1640 associated with a value of the control ID sub-field 1630 may be defined by Table 4 below.

TABLE 4

| Control ID value | Meaning | Length of the Control Information subfield (bits) |
|---|---|---|
| 0 | UL MU response scheduling | 26 |
| 1 | Operating Mode | 12 |
| 2 | HE link adaptation | 16 |
| 3 | Buffer Status Report (BSR) | 26 |
| 4 | UL Power Headroom | 8 |
| 5 | Bandwidth Query Report (BQR) | 10 |
| 6-15 | Reserved | — |

Referring to Table 4, when the control ID sub-field 1630 is set to '1', the control information sub-field 1640 may indicate information (i.e., OMI information) for soliciting a change of an operating mode of an STA which transmits a frame by using 12 bits.

When the control ID sub-field 1630 is set to '3', the control information sub-field 1640 may indicate information (e.g., buffer status information) for a buffer status report of an STA which transmits a frame by using 26 bits.

Hereinafter, it is assumed that a control ID sub-field 1730 of an A-control field 1710 is set to '3' to allocate the buffer status information to the control information sub-field 1640.

Figure 17:
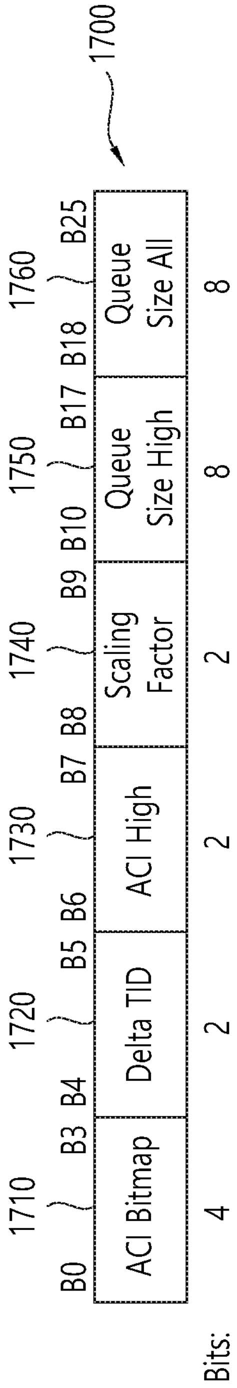
FIG. 17 shows an exemplary format of a control information sub-field for buffer status information according to the present embodiment.

FIG. 17 shows an exemplary format of a control information sub-field for buffer status information according to the present embodiment. Referring to FIG. 1 to FIG. 17, it may be understood that a control information sub-field 1700 is a field corresponding to the control information sub-field 1640 of FIG. 16. The control information sub-field 1700 of FIG. 17 may include 1$^{st}$ to 6$^{th}$ sub-fields 1710 to 1760.

The first sub-field 1710 may consist of 1$^{st}$ to 4$^{th}$ bits (i.e., B0 to B3), and may be referred to as an access category indication (ACI) bitmap field.

Specifically, the 1$^{st}$ to 4$^{th}$ bits (i.e., B0 to B3) of the first sub-field 1710 may correspond to an AC VO type transmission queue, an AC VI type transmission queue, an AC BE type transmission queue, and an AC BK type transmission queue.

The first sub-field 1710 may include bitmap information indicating an access category in which a buffer status of the STA is to be reported. For example, in the presence of a traffic buffered in the transmission queue of the STA, the buffer status may be information associated with an access category corresponding to the transmission queue.

For example, among the 1$^{st}$ to 4$^{th}$ bits (i.e., B0 to B3) of the first sub-field 1710, a bit of a location corresponding to an access category in which a buffer status is to be reported may be indicated by '1'. In addition, among the 1$^{st}$ to 4$^{th}$ bits (i.e., B0 to B3) of the first sub-field 1810, a bit of a location corresponding to an access category in which the buffer status is not reported may be indicated by '0'.

The second sub-field 1720 may consist of 5$^{th}$ and 6$^{th}$ bits (i.e., B4 and B5), and may be referred to as a Delta TID field. According to the present embodiment, the delta TID field may indicate the number of TIDs regarding a traffic buffered in a receiving STA on the basis of the number of access categories indicated by an ACI bitmap field.

The third sub-field 1730 may consist of 7$^{th}$ and 8$^{th}$ bits (i.e., B6 and B7), and may be referred to as an ACI High field. For example, information indicating a transmission queue corresponding to a traffic having a highest user priority among traffics buffered in the STA may be set in the third sub-field 1730.

The fourth sub-field 1740 may consist of 9$^{th}$ and 10$^{th}$ bits (i.e., B8 and B9), and may be referred to as a scaling factor (SF) field. A proper value may be set in the fourth sub-field 1740 to indicate a size of a buffered traffic among a plurality of scale factor values predetermined in an AP and an STA.

For example, if a value indicated in the fourth sub-field 1740 is '0', a scale factor (SF) value may be '16'. In this case, a basic unit for expressing an amount of a traffic buffered in the STA may be 16 octets. If a value which is set in the fourth sub-field 1740 is '1', the SF value may be '128'. In this case, a basic unit for expressing an amount of a traffic buffered in the STA may be 128 octets.

If a value which is set in the fourth sub-field 1740 is '3', the SF value may be '2048'. In this case, a basic unit for expressing an amount of a traffic buffered in the STA may be 2048 octets. If a value which is set in the fourth sub-field 1740 is '4', the SF value may be '16,384'. In this case, a basic unit for expressing an amount of a traffic buffered in the STA may be 16,384 octets.

The fifth sub-field 1750 may consist of $11^{th}$ and $18^{th}$ bits (i.e., b10 to b17), and may be referred to as a Queue Size High field. The fifth sub-field 1750 may indicate queue size information (e.g., an amount of a traffic buffered in a specific transmission queue) regarding a TID indicated by the third sub-field 1730. In addition, the queue size information of the fifth sub-field 1750 may be expressed by using a basic unit based on an SF which is set in the fourth sub-field 1740.

The sixth sub-field 1760 may consist of $19^{th}$ and $25^{th}$ bits (i.e., B20 to B26), and may be referred to as a Queue Size All field. According to the present embodiment, the sixth sub-field 1760 may indicate queue size information regarding all traffics buffered in the STA (e.g., an amount of summing up all traffics buffered in the STA). In addition, queue size information of the sixth sub-field 1760 may be expressed by using a basic unit based on an SF which is set in the fourth sub-field 1740.

More detailed descriptions on the control information sub-field for the buffer status report according to the present embodiment may be understood through the section 9.2.4.6.4.5 of the standard document IEEE P802.11ax/D1.0 disclosed in November 2016.

Figure 18:
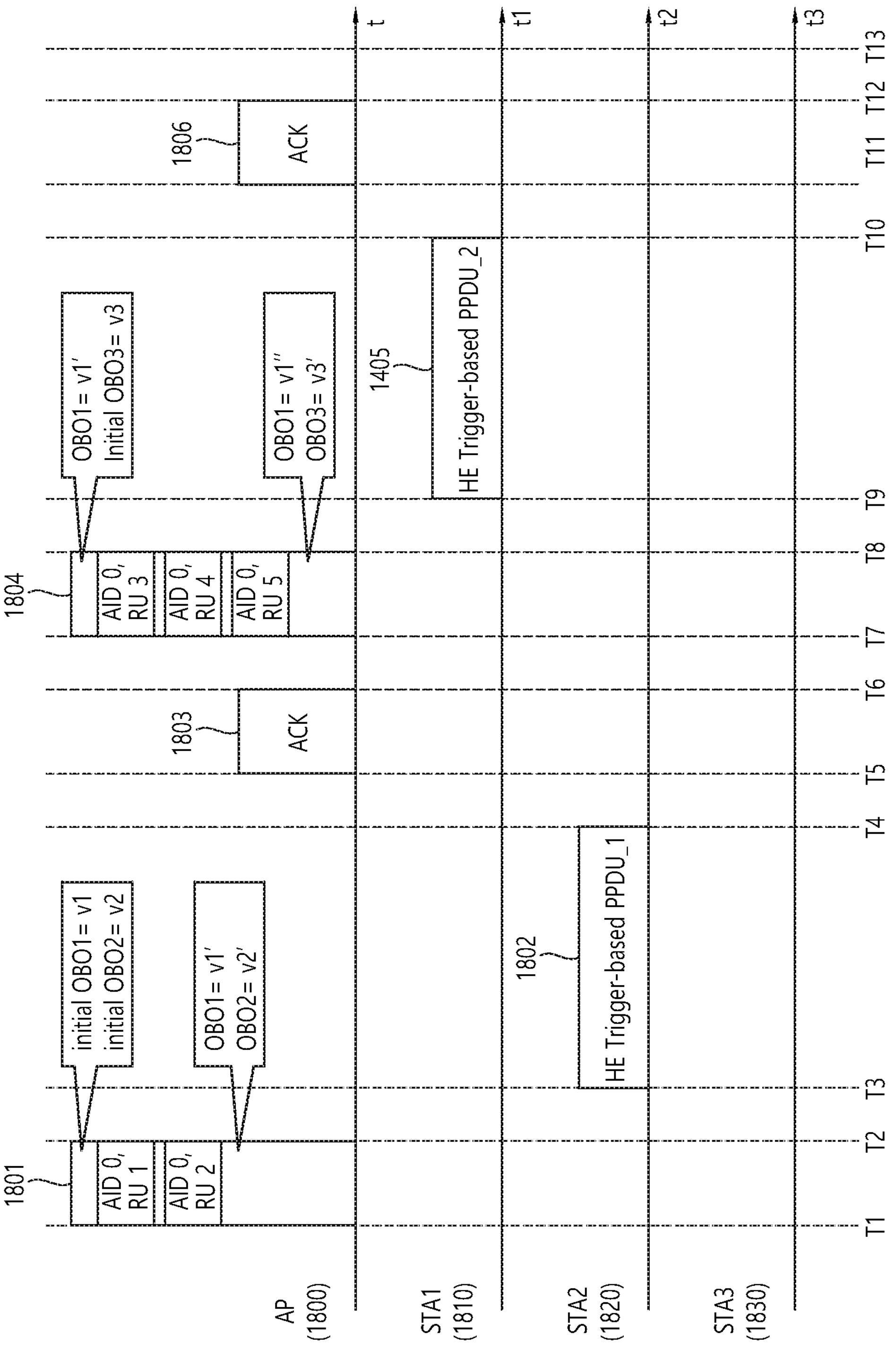
FIG. 18 is a drawing showing an exemplary OFDMA-based random access procedure according to the present embodiment.

FIG. 18 is a drawing showing an exemplary OFDMA-based random access procedure according to the present embodiment.

Referring to FIG. 1 to FIG. 18, a horizontal axis of an AP 1800 may represent a time t of the AP 1800. A horizontal axis of a $1^{st}$ STA 1810 may represent a time t1 of the $1^{st}$ STA 1810, a horizontal axis of a $2^{nd}$ STA 1820 may represent a time t2 of the $2^{nd}$ STA 1820, and a horizontal axis of a $3^{rd}$ STA 1830 may represent a time t3 of the $3^{rd}$ STA 1830. In addition, vertical axes of the AP 1800 and the $1^{st}$ to $3^{rd}$ STAs 1810, 1820, and 1830 may be associated with the presence of a frame to be transmitted.

A trigger frame for a random access procedure mentioned in the present specification may be referred to as a random trigger frame, i.e., a trigger frame for random access (hereinafter, TR).

The TR may be understood as specific identity information (e.g., AID 0) and a trigger frame including a resource unit corresponding to the specific identity information (e.g., AID 0). Therefore, it may be understood that the TR has the frame format of FIG. 8 to FIG. 11 described above.

Referring to FIG. 18, OFDMA contention window (hereinafter, OCW) information associated with a value which can be set in an OFDMA back-off counter (hereinafter, an OBO counter) may be signaled to a plurality of STAs through a beacon frame (not shown) transmitted from the AP 1800.

Specifically, the OBO counter for each of the STAs 1810, 1820, and 1830 may be individually defined. In addition, an OCW for indicating a range of an initial value (i.e., initial OBO) which can be set in the OBO counter may be defined based on the OCW information.

That is, the OCW may be set based on OCW information included in a beacon frame (not shown) transmitted by the AP 1800 prior to a first random trigger frame 1801. For example, the OCW information included in the beacon frame (not shown) may include a value OCWmin.

Each STA which performs an OFDMA-based random access procedure may individually set an initial value (i.e., initial OBO) of an OBO counter. Specifically, each STA may set a value randomly selected in a duration of [0, OCWmin] as the initial value (i.e., initial OBO) of the OBO counter on the basis of the OCW information.

For example, upon receiving the beacon frame (not shown) from the AP 1800, in order to perform the OFDMA-based random access procedure, the $1^{st}$ to $3^{rd}$ STAs 1810, 1820, and 1830 may individually set the initial value (i.e., initial OBO) of the OBO counter of each STA on the basis of the OCW information included in the beacon frame (not shown).

For example, a value included in OCW information included in a beacon frame (not shown) transmitted prior to the first random trigger frame 1801 is assumed as '7'.

The $1^{st}$ STA 1810 may set an integer value v1 randomly selected from [0, CWmin] as a first initial value (i.e., initial OBO1) in a first OBO counter. For example, the $1^{st}$ STA 1810 may set a value '3' selected from [0, 7] as the first initial value (i.e., initial OBO1) in the first OBO counter.

The $2^{nd}$ STA 1820 may set an integer value v2 randomly selected from [0, CWmin] as a second initial value (e.g., initial OBO2) in a second OBO counter. For example, the $2^{nd}$ STA 1820 may set a value '1' selected from [0, 7] as the second initial value (i.e., initial OBO2) in the second OBO counter.

The $3^{rd}$ STA 1830 may set an integer value v3 randomly selected from [0, CWmin] as a third initial value (i.e., initial OBO3) of a third OBO counter. For example, the $3^{rd}$ STA TA 1830 may set a value '4' selected from [0, 7] as the third initial value (i.e., initial OBO3) of the third OBO counter.

In a $1^{st}$ duration T1~T2 of FIG. 18, the AP 1800 may transmit a first random trigger frame 1801. In addition, it is assumed that STAs which intend to perform a random access procedure in a first cycle T1~T7 are the $1^{st}$ and $2^{nd}$ STAs 1810 and 1820.

The first random trigger frame 1801 may include resource allocation information indicating a plurality of resource units (RUs) allocated by the AP 1800. For example, the resource allocation information may indicate two RUs, i.e., RU1 and RU2.

AID information included in a first per-user information field (e.g., 960#1 of FIG. 9) of the first random trigger frame 1801 may be set to '0'. In addition, a first RU allocation field included in the first per-user information field may be set to indicate the first RU (i.e., RU1).

AID information included in a second per-user information field (e.g., 960#2 of FIG. 9) of the first random trigger frame 1801 may be set to '0'. In addition, a second RU allocation field included in the second per-user information field may be set to indicate the second RU (i.e., RU2).

Upon receiving a random trigger frame (TR), each of the STA 1810 and 1820 may determine an RU indicated in an RU allocation field corresponding to a per-user information field including AID information which is set to '0', as an RU used in an OFDMA-based random access procedure.

The $1^{st}$ STA 1810 may perform a first countdown operation. The $1^{st}$ STA 1810 may decrease a first initial value v1 which is set in a first OBO counter by the number '2' of the first and second RUs (i.e., RU1 and RU2). Accordingly, a first count value v1' updated in the first OBO counter is '1'.

The 2nd STA 1820 may perform a second countdown operation. The 2nd STA 1820 may update a value v2' of a second OBO counter to '0' by decreasing a second initial value v2 which is set in a second OBO counter. Accordingly, the second countdown operation may be complete.

The 2nd STA 1820 which has completed the second countdown operation may select one of RU sets (i.e., RU1 and RU2) allocated to the first random trigger frame 1801 as a random RU. For example, the 2nd STA 1820 may select the second RU (i.e., RU2) as a random RU for transmission of a first uplink frame.

A 2nd duration T2~T3 may be a short inter-frame space (SIFS).

In a 3rd duration T3~T4, the 2nd STA 1820 may transmit a first trigger-based frame (i.e., HE Trigger-based PPDU_1) 1802 corresponding to the first random trigger frame 1801 to the AP 1800 by using the random RU.

A 4th duration T4~T5 may be an SIFS.

In a 5th duration T5~T6, as illustrated, the 2nd STA 1820 according to an embodiment of the present specification may receive an ACK frame 1803 in response to the first trigger-based frame 1802.

In a 6th duration T6~T7, the AP 1400 and the 1st to 3rd STAs 1810, 1820, and 1830 may wait.

In a 7th duration T7~T8, the AP 1800 of FIG. 14 may transmit a second random trigger frame 1804. In addition, it is assumed that STAs which intend to perform the random access procedure in a second cycle T7~T13 are the 1st and 3rd STAs 1810 and 1830.

For example, for the OFDMA-based random access procedure, the second random trigger frame 1804 may include allocation information indicating a plurality of RUs allocated by the AP 1800. For example, the allocation information may indicate three RUs (i.e., RU3, RU4, and RU5).

A first user identifier field of a first user-specific field (e.g., 960#1 of FIG. 9) of the second random trigger frame 1804 may be set to '0'. In addition, a first RU allocation field of the first user-specific field may be set to indicate a third RU (i.e., RU3).

A second user identifier field of a second user-specific field (e.g., 960#2 of FIG. 9) of the second random trigger frame 1804 may be set to '0'. In addition, a second RU allocation field of the second user-specific field may be set to indicate a fourth RU (i.e., RU4).

A third user identifier field of a third user-specific field (e.g., 960#3 of FIG. 9) of the second random trigger frame 1804 may be set to '0'. In addition, a third RU allocation field of the third user-specific field may be set to indicate a fifth RU (i.e., RU5).

In a 7th duration T7~T8, the 1st STA 1810 may resume a first countdown operation. The 1st STA 1810 may update a value v1" of a first OBO counter to '0' by decreasing a first initial value v1' which is kept in the first OBO counter. Accordingly, the first countdown operation may be complete.

The 1st STA 1810 which has completed the first countdown operation may select one of RU sets (i.e., RU3, RU4, and RU5) allocated to the second random trigger frame 1804 as a random RU. For example, the 1st STA 1810 may select the third RU (i.e., RU3) as a random RU for transmission of a second uplink frame.

The 3rd STA 1830 may initiate a third countdown operation. The 3rd STA 1830 may sequentially decrease a third initial value (i.e., initial OBO3) set in a third OBO counter by the number '3' of third to fifth RUs (i.e., RU3 to RU5). Accordingly, a third count value v3 which is kept in the third OBO counter is '2'.

An 8th duration T8~T9 may be an SIFS.

In a 9th duration T9~T10, the 1st STA 1810 may transmit a second trigger-based frame (HE Trigger-based PPDU_2) 1805 corresponding to the second random trigger frame 1804 to the AP 1800 by using a random RU.

A 10th duration T10~T11 may be an SIFS.

In an 11th duration T11~T12, as illustrated, the 1st STA 1810 according to an embodiment of the present specification may receive an ACK frame 1806 in response to the second trigger-based frame 1805.

In a 12th duration T12~T137, the AP 1800 and the 1st to 3rd STAs 1810, 1820, and 1830 may wait.

If an STA which has completed the random access procedure fails to receive an ACK frame corresponding to an uplink frame transmitted through the random RU, in order to decrease a collision possibility between STAs, the STA which has failed to receive the ACK frame may exponentially increase an OCW range for uplink transmission.

That is, the exponential increasing of the OCW range may imply increasing of a counter window (CW) of an OBO counter to [0, 2*OCW+1]. Subsequently, the STA may set a value randomly selected from a duration of the increased CW to an initial value for the OBO counter, and thereafter may perform the random access procedure.

In the present specification, the random access procedure performed again based on the increased OCW range may be understood as a procedure for retransmission.

Figure 19:
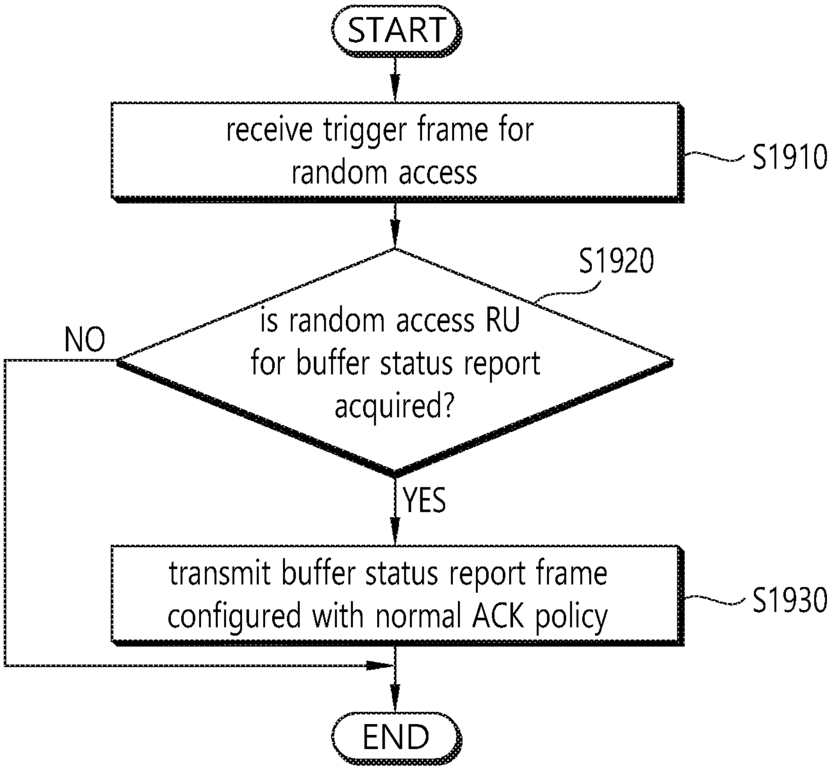
FIG. 19 is a flowchart showing a method for a frame transmitted based on random access in a wireless LAN system according to the present embodiment.

FIG. 19 is a flowchart showing a method for a frame transmitted based on random access in a wireless LAN system according to the present embodiment.

Referring to FIG. 1 to FIG. 19, in step S1910, a user STA (e.g., 1810, 1820, and 1830 of FIG. 18) may receive from an access point (AP) a random trigger frame (TR) (e.g., 1801 and 1804) including resource information indicating identification information for random access and a random access RU corresponding to the identification information.

For example, the random trigger frame may include at least one piece of identification information for random access and a random access RU corresponding to at least one piece of identification information.

In step S1920, the user STA may determine whether to acquire the random access RU. Specifically, the user STA may perform a countdown operation to acquire a random access RU for an uplink frame to be transmitted to the AP. In this case, the countdown operation mentioned in FIG. 19 may be understood based on the countdown operation mentioned in the 1st duration T1~T2 and 7th duration T7~T8 of FIG. 18.

If the user STA fails to acquire the random access RU, the procedure of FIG. 19 is finished. That is, if the user STA fails to complete the countdown operation according to the received random trigger frame (TR), the user STA may wait to receive a subsequent random trigger frame.

If the user STA completes the countdown operation according to the received random trigger frame (TR), step S1930 may be performed.

In step S1930, the user STA according to the present embodiment may transmit to the AP an uplink frame which solicits acknowledge of the AP by using a random access RU (e.g., the random RU mentioned in FIG. 18) acquired through the countdown operation.

The uplink frame according to the present embodiment may include buffer status information. In addition, the buffer status information may be included in the aforementioned HT control field 1519 of the MAC frame 1500 of FIG. 15. The buffer status information of FIG. 19 may be understood based on the content described with reference to FIG. 12 to FIG. 17.

For example, the AP (e.g., 1800 of FIG. 18) may transmit to the user STA a buffer status report polling-type trigger frame which solicits an uplink frame including buffer status information. That is, in FIG. 18, the random trigger frames 1801 and 1804 transmitted by the AP may be understood as the buffer status report polling-type trigger frame.

For another example, it may be assumed that an uplink frame is a beamforming feedback report frame. In this case, in order to receive the beamforming feedback report frame as the uplink frame, the AP may transmit the beamforming report poll-type trigger frame.

In the present embodiment, the beamforming feedback report frame or the uplink frame including the buffer status information mentioned as an example of the uplink frame may be understood as a control frame.

When the control frame is received, the AP needs to explicitly establish an ACK policy for the control frame in terms of overall performance improvement of a wireless LAN system.

Unlike in the conventional method in which the ACK policy of the uplink frame is established to be unsolicited, an ACK policy of a user STA which is an entity for transmitting an uplink frame may be established to solicit ACK of an AP even if there is a polling-type trigger frame corresponding to the uplink frame in the wireless LAN system according to the present embodiment.

As mentioned above, the uplink frame according to the present embodiment may include an ACK policy indicator. The ACK policy indicator may indicate whether a receiving terminal of an uplink frame received through a random access procedure transmits an ACK frame. The ACK policy indicator may be included in the QoS control field 1518 of FIG. 15.

Eventually, the uplink frame according to the present embodiment may be understood as a frame which solicits ACK from the receiving terminal. Referring to Table 13 above, an ACK policy indicator of 2 bits included in the QoS control field 1518 may be set to ‘00’.

Figure 20:
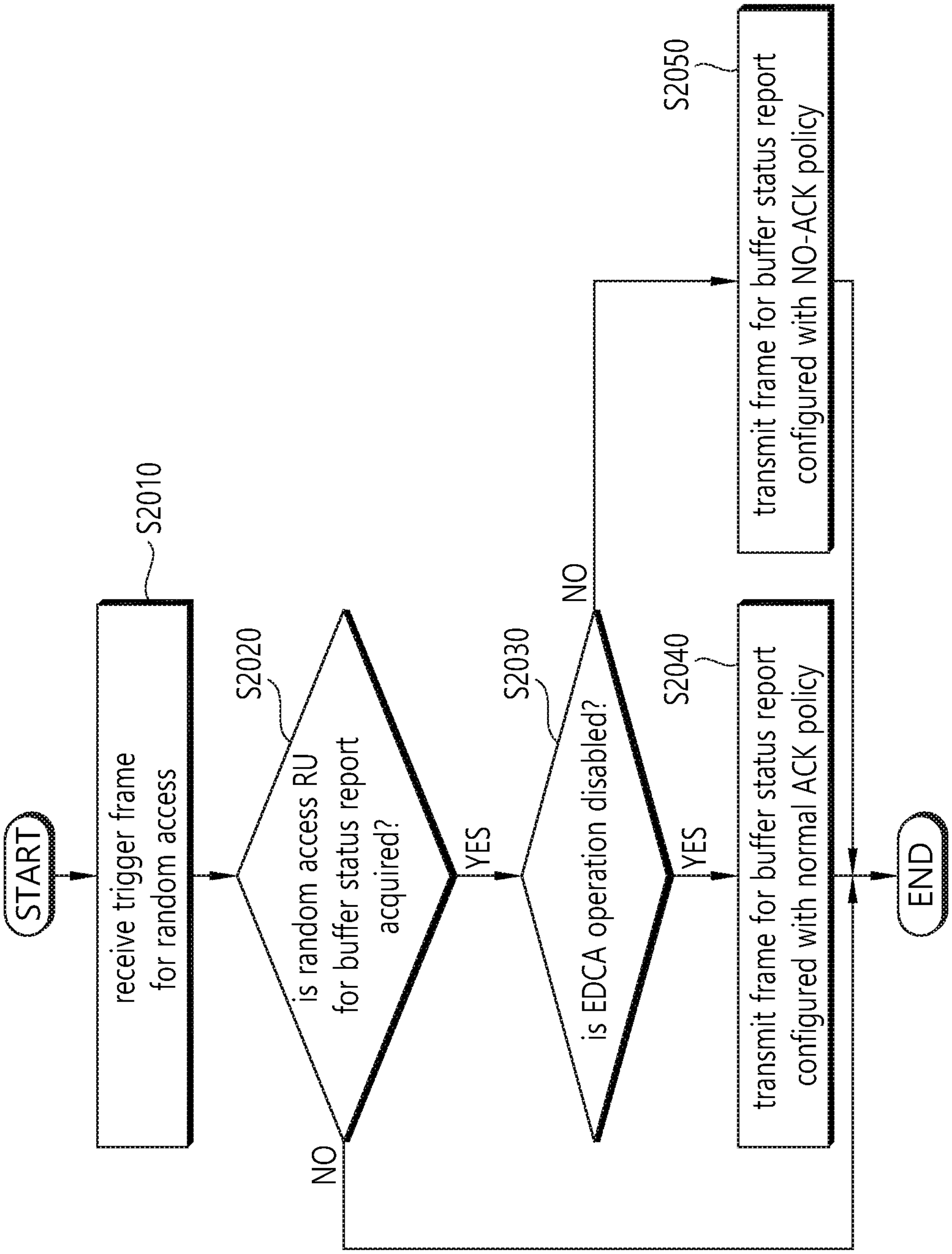
FIG. 20 is a flowchart showing a method for a frame transmitted based on random access in a wireless LAN system according to another present embodiment.

FIG. 20 is a flowchart showing a method for a frame transmitted based on random access in a wireless LAN system according to another present embodiment.

Referring to FIG. 1 to FIG. 20, the description of steps S2010 and S2020 may be understood as the content mentioned in steps S1901 and S1920 of FIG. 19 described above.

According to another present embodiment, when a user STA acquires a random access RU allocated to a random trigger frame (TR) through a countdown operation, step S2030 may be performed.

In step S2030, the user STA may determine whether a contention-based EDCA procedure is enabled. If it is determined that the EDCA procedure is disabled, step S2040 may be performed.

In step S2040, the user STA may establish an ACK policy for an uplink frame to be transmitted by using a random access RU (i.e., the random RU mentioned in FIG. 18) as a normal ACK policy.

For example, the normal ACK policy may imply a method of soliciting ACK of an AP which has received an uplink frame.

If it is determined that the EDCA procedure is enabled, step S2050 may be performed. In step S2050, the user STA may establish an ACK policy for an uplink frame to be transmitted by using a random access RU (e.g., the random RU mentioned in FIG. 18) as a NO-ACK policy.

For example, the NO-ACK policy may imply a method in which ACK of the AP which has received the uplink frame is unsolicited.

Figure 21:
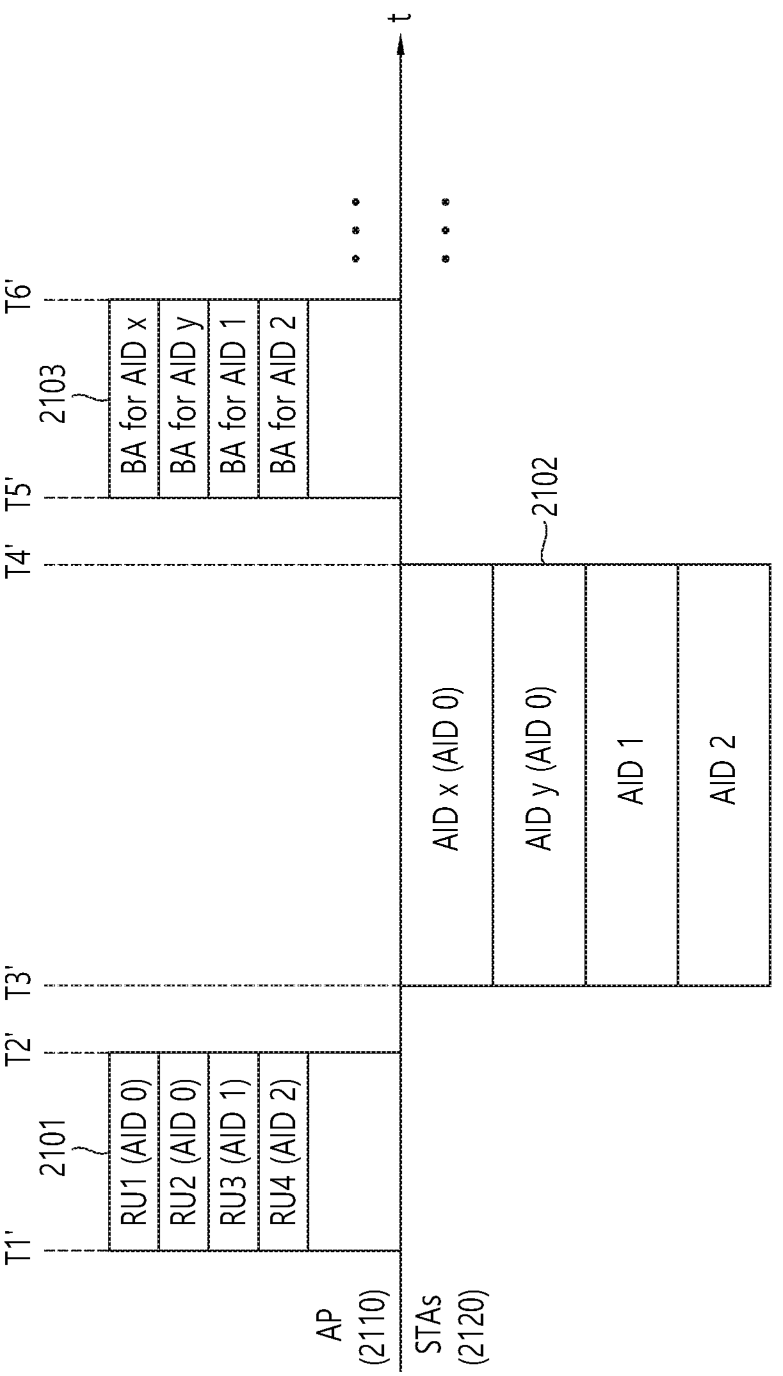
FIG. 21 is a diagram showing an example of an ACK procedure in a random access procedure of another present embodiment.

FIG. 21 is a diagram showing an example of an ACK procedure in a random access procedure of another present embodiment.

A horizontal axis of FIG. 21 may correspond to a time t of an AP and a plurality of STAs. With respect to the horizontal axis of FIG. 21, an upper portion may be associated with the existence of a frame transmitted by an AP 2110. With respect to the horizontal axis of FIG. 21, a lower portion may be associated with the existence of a frame transmitted by a plurality of STAs 2120.

Referring to FIG. 1 to FIG. 21, the AP 2110 of FIG. 21 may correspond to the AP 1800 of FIG. 18. The plurality of STAs 2120 of FIG. 21 may correspond to $1^{st}$ and $2^{nd}$ STAs of FIG. 18.

In addition, a $1^{st}$ duration T1'~T2' may be understood based on the $1^{st}$ duration T1~T2 of FIG. 18. However, not only an uplink RU (e.g., RU3 and RU4 of FIG. 21) individually allocated for each user STA on the basis of identification information (e.g., AID1, AID2) but also a random access resource unit (e.g., RU1 and RU2 of FIG. 21) allocated to any STA through the random access procedure may be allocated together in a trigger frame 2101 transmitted in the $1^{st}$ duration T1'~T2' of FIG. 21.

A $2^{nd}$ duration T2'~T3' may be an SIFS duration.

In a $3^{rd}$ duration T3'~T4', an uplink frame 2102 may be transmitted from a plurality of user STAs. The uplink frame 2102 transmitted in the $3^{rd}$ duration T3'~T4' of FIG. 21 may be a frame of a UL MU PPDU format.

In a $3^{rd}$ duration T3'~T4', the uplink frame 2102 to be transmitted may include a plurality of frames transmitted by using an RU allocated individually at an overlapping time from the plurality of user STAs.

For example, a user STA corresponding to first identification information (e.g., .AID 1) may transmit a frame according to an uplink RU (e.g., the RU of FIG. 21). For another example, a user STA corresponding to second identification information (e.g., AID 2) may transmit a frame according to an uplink RU (e.g., the RU4 of FIG. 21).

Among the plurality of user STAs 2102 which have received a trigger frame 2101, a user STA which has completed the random access procedure of FIG. 18 may acquire any one of a random access RU (e.g., the RU1 and RU2 of FIG. 21) in which third identification information (e.g., AID 0) is set.

For example, the user STA which has completed the random access procedure may transmit a frame to the AP 2110 by using the acquired first random access RU (e.g., the RU1 of FIG. 21). In addition, another user STA which has completed the random access procedure may transmit a frame to the AP 2110 by using the acquired second random access RU (e.g., the RU2 of FIG. 21).

A $4^{th}$ duration T4'~T5' may be an SIFS duration.

In a $5^{th}$ duration T5'~T6', the AP 2110 may transmit an M-STA BA frame 2103 to the plurality of user STAs.

An ACK procedure may be performed individually for frames transmitted based on an uplink RU (e.g., the RU3 and RU4 of FIG. 21) through the M-STA BA frame 2103 of FIG. 21. In addition, the ACK policy may be performed individually for frames transmitted based on a random access RU (e.g., the RU1 and RU2 of FIG. 21) through the M-STA BA frame 2103.

The M-STA BA frame 2103 transmitted in the 5th duration T5'~T6' is described in greater detail with reference to drawings described below.

Even in case of conforming to another present embodiment, if there is a polling-type trigger frame corresponding to an uplink frame (e.g., a beamforming feedback report, a buffer status report) transmitted through the random access procedure, an ACK policy of the uplink frame may be established as a normal ACK policy which solicits ACK of the AP.

Figure 22:
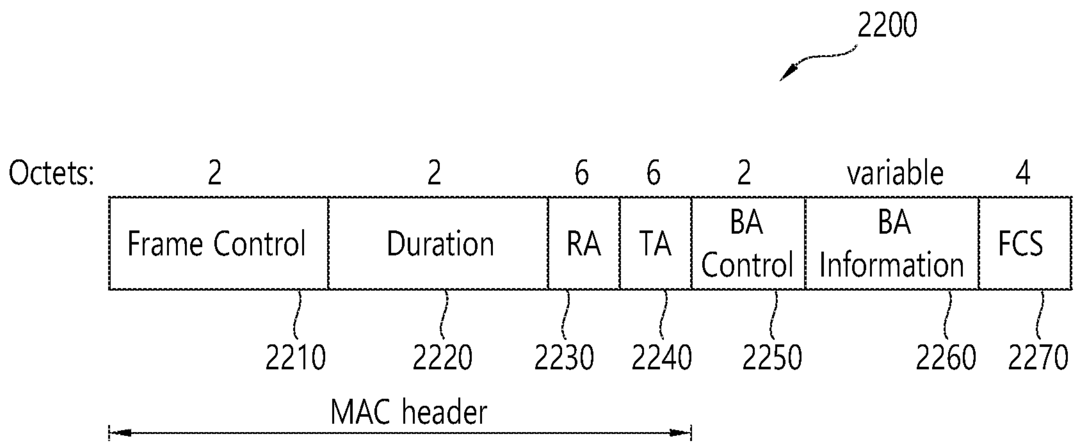
FIG. 22 and FIG. 23 show an exemplary format of a BA frame of the present embodiment.
Figure 23:
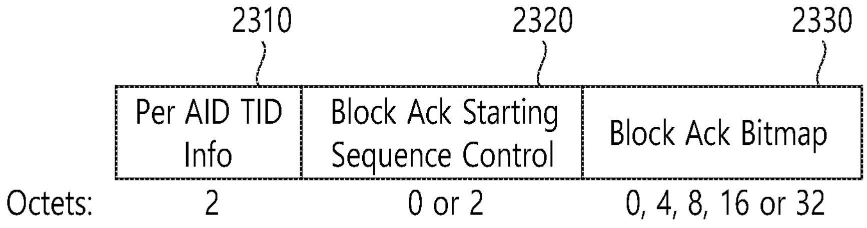

FIG. 22 and FIG. 23 show an exemplary format of a BA frame of the present embodiment. Referring to FIG. 1 to FIG. 23, a BA frame 2200 may include a frame control field 2210, a duration field 2220, an RA field 2230, a TA field 2240, a BA control field 2250, a BA information field 2260, and an FCS field 2270.

In particular, the BA control field 2250 may be a common control field, and the BA information field 2260 may be a user-specific field for an individual user STA. The BA information field 2260 may be delivered individually to user STAs different from one another. The BA information field 2260 may include a sub-field of FIG. 23, which is allocated individually for each user STA.

Specifically, an AP may allow the Per AID TID Info field 2310 of FIG. 23 to include identification information (e.g., AID information, ACK scheme information, TID information) for a plurality of user STAs which have transmitted a plurality of uplink frames.

In addition, the AP may inform each user STA of whether an MSDU or A-MASU constituting a plurality of uplink frames on the basis of a BA starting sequence control field 2320 and BA bitmap field 2330 of FIG. 23 is successfully received.

The BA frame 2200 may be understood as the aforementioned BA frame of FIG. 21. That is, in order to inform each user STA of successful reception of the plurality of uplink frames transmitted from the plurality of user STAs, the AP may use the BA frame 2200.

The BA frame of FIG. 22 may be understood through the section 9.2.4.6.4.5 of the standard document IEEE P802.11ax/D1.0 disclosed in November 2016.

Figure 24:
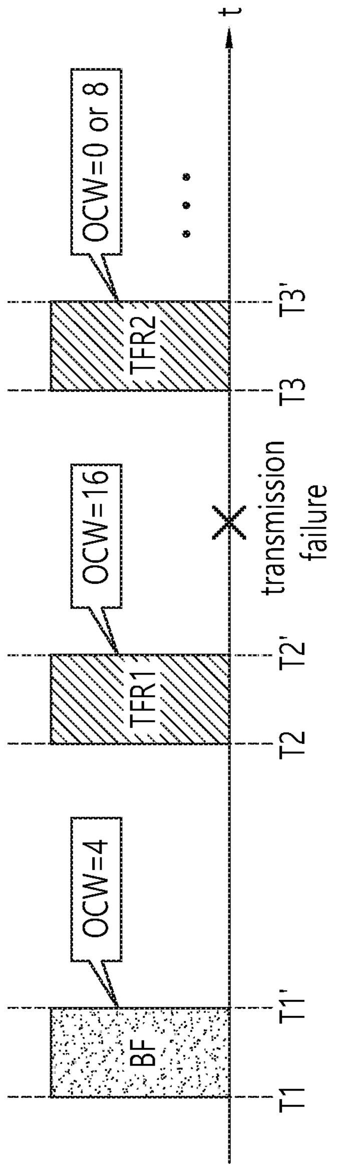
FIG. 24 and FIG. 25 are drawings for explaining a retransmission procedure according to the present embodiment.
Figure 25:
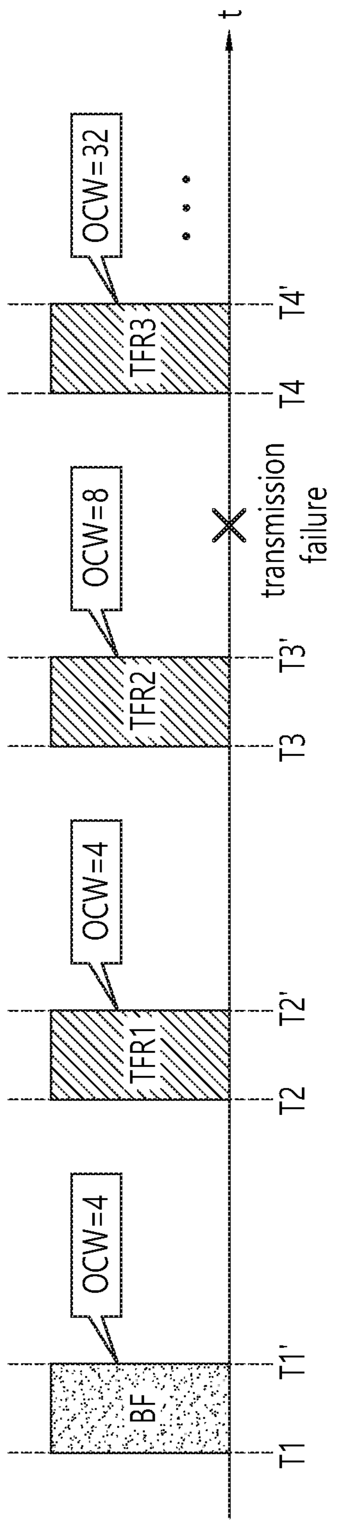

FIG. 24 and FIG. 25 are drawings for explaining a retransmission procedure according to the present embodiment. A horizontal axis of FIG. 24 and FIG. 25 may represent a time t of a wireless LAN system, and a vertical axis may be associated with a frame transmitted in the wireless LAN system.

The retransmission procedure of FIG. 24 and FIG. 25 may be a procedure performed by a user STA when the user STA transmits a frame through a random access RU acquired through a random access procedure and an ACK frame is not received from an AP during a specific time.

As mentioned above, the STA which has failed to receive the ACK frame may exponentially increase an OCW range for uplink transmission. An operation of exponentially increasing of the OCW range may be understood as an operation of increasing an OCW range which can be set in an OBO counter to [0, 2*OCW+1].

The STA may set a value randomly selected from the increased OCW range to an initial value (i.e., initial OBO) for an OBO counter, and thereafter may perform the random access procedure again.

In the embodiment of FIG. 24 and FIG. 25, OCW information indicating a range of an initial value (i.e., initial OBO) which can be set in an OBO counter may include both a beacon frame (BF) and a random trigger frame (TFR) including a random access RU.

The embodiment of FIG. 24 is an example in which OCW information included in the random trigger frame (TFR) is not applied to the initial value (i.e., initial OBO) of the OBO counter but applied only to the retransmission procedure.

For clear and concise understanding of FIG. 24, the retransmission procedure of FIG. 24 may be described based on FIG. 18. OCW information of a beacon frame (BF) received in the 1st duration T1~T1' of FIG. 24 is ‘4’.

Although not shown in FIG. 24, a plurality of user STAs (e.g., 1810 and 1820 of FIG. 18) which have received the BF may set an initial value (e.g., the initial OBO1 and initial OBO2 of FIG. 18) of an OBO counter on the basis of the OCW information ‘4’.

A 2nd duration T2~T2' of FIG. 24 may be understood based on the 1st duration T1~T2 of FIG. 18. Although not shown in FIG. 24, a specific user STA (e.g., 1820 of FIG. 18) may acquire a random access RU through the random access procedure.

According to the present embodiment, OCW information ‘16’ included in a first random trigger frame (TFR1) of the 2nd duration T2~T2' of FIG. 24 may not be used for the initial value (i.e., initial OBO) of the OBO counter.

After receiving the TFR1, a specific user STA (e.g., 1820 of FIG. 18) which has acquired the random access RU may transmit an uplink frame (e.g., 1802 of FIG. 18) to an AP (e.g., 1800 of FIG. 18) through the random access RU.

In the embodiment of FIG. 24, the user STA (e.g., 1820 of FIG. 18) may fail to attempt transmission of the uplink frame (e.g., 1802 of FIG. 18) using the acquired random access RU.

For example, although the user STA (e.g., 1820 of FIG. 18) transmits the uplink frame (e.g., 1802 of FIG. 18), an ACK frame of the AP (e.g., 1800 of FIG. 18) may not be received in response thereto.

According to OCW information of the random trigger frame received in the 3rd duration T3~T3' of FIG. 24, the retransmission procedure of the user STA may be classified into two cases. In addition, the 3rd duration T3~T3' of FIG. 24 may be understood based on the 7th duration T7~T8 of FIG. 18.

For example, a case where OCW information included in a second random trigger frame (TFR2) of the 3rd duration T3~T3' of FIG. 24 is set to ‘0’. The user STA (e.g., 1820 of FIG. 18) may receive the TFR2 in which OCW information is set to ‘0’.

In this case, the user STA (e.g., 1820 of FIG. 18) may perform the retransmission procedure on the basis of the most recently used OCW information ‘4’ to set the initial value (i.e., initial OBO) of the OBO counter. That is, the user STA (e.g., 1820 of FIG. 18) may increase an OCW range to [0, 2*4+1] for the retransmission procedure.

For another example, a case where OCW information included in the TFR2 of the 3rd duration T3~T3' of FIG. 24 is set to ‘8’ (i.e., non-zero value) is described. The user STA (e.g., 1820 of FIG. 18) may receive the TFR2 in which OCW information is set to ‘8’.

In this case, the user STA (e.g., 1820 of FIG. 18) may perform the retransmission procedure on the basis of OCW information ‘8’ included in the most recently received trigger frame to set the initial value (i.e., initial OBO) of the OBO counter. That is, the user STA (e.g., 1820 of FIG. 18) may increase the OCW range to [0, 2*8+1] for the retransmission procedure.

The embodiment of FIG. 25 is an example in which OCW information included in a TFR is applied to both the initial OBO and the retransmission procedure.

For clear and concise understanding of FIG. 25, the retransmission procedure of FIG. 254 may be described based on FIG. 18. OCW information of a beacon frame (BF) received in the $1^{st}$ duration T1~T1' of FIG. 25 is '4'.

Although not shown in FIG. 25, a plurality of user STAs (e.g., 1810 and 1820 of FIG. 18) which have received the BF may set an initial value (the initial OBO1 and initial OBO2 of FIG. 18) of an OBO counter on the basis of the OCW information '4'.

In the $2^{nd}$ duration T2~T2' of FIG. 25, OCW information '4' included in the TFR1 may be used for the initial value (i.e., initial OBO) of the OBO counter.

Although not shown in FIG. 25, a plurality of user STAs (e.g., 1810 and 1820 of FIG. 18) which have received the TFR1 may re-set the initial value (i.e., the initial OBO1 and initial OBO2 of FIG. 18) of the OBO counter on the basis of the OCW information '4'.

In the $3^{rd}$ duration T3~T3' of FIG. 25, a specific user STA may acquire a random access RU through the random access procedure performed based on the TFR2.

After receiving the TFR2, the specific user STA which has acquired the random access RU may transmit the uplink frame to the AP (e.g., 1800 of FIG. 18) through the random access RU.

In the embodiment of FIG. 25, the user STA may fail to attempt transmission of the uplink frame using the acquired random access RU. For example, although the user STA transmits the uplink frame, an ACK frame of the AP may not be received in response thereto.

In the $4^{th}$ duration T4~T4' of FIG. 25, the retransmission procedure of the user STA may be classified into two cases.

For example, the user STA may perform the retransmission procedure according to most recently used OCW information to set an initial value (i.e., initial OBO) of the OBO counter.

In this case, the most recently used OCW information may be OCW information '4' included in the first random trigger frame (TFR1). Accordingly, the user STA may increase a range of the OCW to [0, 2*4+1] for the retransmission procedure.

For another example, the user STA may perform the retransmission procedure according to the most recently received OCW information at a time of attempting the retransmission procedure to set an initial value (i.e., initial OBO) of the OBO counter.

In this case, the most recently received OCW information may be OCW information '32' included in the third random trigger frame (TFR3). Accordingly, the user STA may increase an OCW range to [0, 2*32+1] for the retransmission procedure.

FIG. 26 is a block view illustrating a wireless device to which the exemplary embodiment of the present invention can be applied.

Referring to FIG. 26, as an STA that can implement the above-described exemplary embodiment, the wireless device may correspond to an AP or a non-AP station (STA). The wireless device may correspond to the above-described user or may correspond to a transmitting device transmitting a signal to the user.

The AP (2600) includes a processor 2610, a memory 2620, and a radio frequency (RF) unit 2630.

The RF unit 2630 is connected to the processor 2610, thereby being capable of transmitting and/or receiving radio signals.

The processor 2610 implements the functions, processes, and/or methods proposed in the present invention. For example, the processor 2610 may be implemented to perform the operations according to the above-described exemplary embodiments of the present invention. More specifically, among the operations that are disclosed in the exemplary embodiments of FIG. 1 to FIG. 25, the processor 2610 may perform the operations that may be performed by the AP.

The non-AP STA 2650 includes a processor 2660, a memory 2670, and a radio frequency (RF) unit 2680.

The RF unit 2680 is connected to the processor 2660, thereby being capable of transmitting and/or receiving radio signals.

The processor 2660 implements the functions, processes, and/or methods proposed in the present invention. For example, the processor 2660 may be implemented to perform the operations of the non-AP STA according to the above-described exemplary embodiments of the present invention. The processor may perform the operations of the non-AP STA, which are disclosed in the exemplary embodiments of FIG. 1 to FIG. 25.

The processor 2610 and 2660 may include an application-specific integrated circuit (ASIC), another chip set, a logical circuit, a data processing device, and/or a converter converting a baseband signal and a radio signal to and from one another. The memory 2620 and 2670 may include a read-only memory (ROM), a random access memory (RAM), a flash memory, a memory card, a storage medium, and/or another storage device. The RF unit 2630 and 2680 may include one or more antennas transmitting and/or receiving radio signals.

When the exemplary embodiment is implemented as software, the above-described method may be implemented as a module (process, function, and so on) performing the above-described functions. The module may be stored in the memory 2620 and 2670 and may be executed by the processor 2610 and 2660. The memory 2620 and 2670 may be located inside or outside of the processor 2610 and 2660 and may be connected to the processor 2610 and 2660 through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method in a wireless local area network (WLAN) system, the method comprising:

receiving, by a user station (STA), a trigger frame which is a buffer status report poll-type frame including identification information for a random access, resource information on a random access resource unit related to the identification information from an access point (AP), and a first orthogonal frequency division multiple access (OFDMA) contention window (OCW) value for a first countdown operation;

performing, by the user STA, the first countdown operation for the random access resource unit using the first OCW value;

transmitting, by the user STA, a first quality of service (QoS) null data frame including buffer status information for a traffic buffered in the user STA to the AP based on the random access resource unit acquired through the first countdown operation and acknowledgement (ACK) policy information related to whether the first QoS null data frame is a frame which solicits acknowledgement of the AP;

when transmission of the first QoS null data frame is failed, receiving, by the user STA, a second trigger frame including a second OCW value from the AP;

determining, by the user STA, whether the second OCW value is equal to a predetermined value;

based on the second OCW value being equal to the predetermined value, performing, by the user STA, a second countdown operation for the random access resource unit using the first OCW value; and based on the second OCW value being not equal to the predetermined value, performing, by the user STA, the second countdown operation for the random access resource unit using the second OCW value.

2. The method of claim 1, wherein the identification information includes an associate identifier which is set to '0'.

3. The method of claim 1, further comprising, determining whether to enable a contention-based enhanced distributed channel access (EDCA) procedure, if the user STA acquires the random access resource unit through the first countdown operation.

4. The method of claim 3, wherein the ACK policy information is set so that the first QoS null data frame solicits acknowledgement of the AP, based on the EDCA procedure being disabled.

5. The method of claim 4, further comprising determining, by the user STA, that the transmission of the first QoS null data frame is failed when an ACK frame is not received in response to the first QoS null data frame.

6. The method of claim 3, wherein the ACK policy information is set so that the first QoS null data frame does not solicit acknowledgement of the AP, based on the EDCA procedure being enabled.

7. The method of claim 1, wherein the first QoS null data frame further includes a medium access control (MAC) header including a high throughput (HT) control field and a quality of service (QoS) control field, and wherein the buffer status information is included in the HT control field.

8. The method of claim 1, further comprising, transmitting, by the user STA, a second QoS null data frame to the AP.

9. The method of claim 1, wherein the predetermined value is set to '0'.

10. A wireless terminal using a method in a wireless local area network (LAN) system, the wireless terminal comprising:

a transceiver transmitting and receiving a radio signal; and a processor operatively coupled to the transceiver, wherein the processor is configured to:

receive a trigger frame which is a buffer status report poll-type frame including identification information for a random access, resource information on a random access resource unit related to the identification information from an access point (AP), and a first orthogonal frequency division multiple access (OFDMA) contention window (OCW) value for a first countdown operation;

perform the first countdown operation for the random access resource unit using the first OCW value;

transmit a first quality of service (QoS) null data frame including buffer status information for a traffic buffered in the user STA to the AP based on the random access resource unit acquired through the first countdown operation and acknowledgement (ACK) policy information related to whether the first QoS null data frame is a frame which solicits acknowledgement of the AP;

when transmission of the first QoS null data frame is failed, receive a second trigger frame including a second OCW value from the AP;

determine whether the second OCW value is equal to a predetermined value;

based on the second OCW value being equal to the predetermined value, perform a second countdown operation for the random access resource unit using the first OCW value; and based on the second OCW value being not equal to the predetermined value, perform the second countdown operation for the random access resource unit using the second OCW value.

* * * * *